(12) United States Patent
Hosono et al.

(10) Patent No.: US 12,739,521 B2
(45) Date of Patent: Sep. 15, 2026

(54) IMAGE CAPTURING APPARATUS, CONTROL METHOD FOR IMAGE CAPTURING APPARATUS, AND STORAGE MEDIUM

(71) Applicant: CANON KABUSHIKI KAISHA, Tokyo (JP)

(72) Inventors: Suguru Hosono, Tokyo (JP); Aihiko Numata, Tokyo (JP); Toshiya Ishioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 18/437,332

(22) Filed: Feb. 9, 2024

(65) Prior Publication Data

US 2024/0292111 A1 Aug. 29, 2024

(30) Foreign Application Priority Data

Feb. 24, 2023 (JP) ................................ 2023-027237

(51) Int. Cl.
*H04N 23/81* (2023.01)
*H04N 23/60* (2023.01)
(Continued)

(52) U.S. Cl.
CPC ............ *H04N 23/81* (2023.01); *H04N 23/64* (2023.01); *H04N 23/667* (2023.01); *H04N 25/683* (2023.01)

(58) Field of Classification Search
CPC .... H04N 23/81; H04N 23/667; H04N 25/683; H04N 23/64
See application file for complete search history.

(56) References Cited

U.S. PATENT DOCUMENTS 9,307,170 B2 4/2016 Numata
9,319,607 B2 4/2016 Numata
(Continued)

FOREIGN PATENT DOCUMENTS

JP 2022-106649 A 7/2022

OTHER PUBLICATIONS

U.S. Appl. No. 18/437,342, filed Feb. 9, 2024 (First Named Inventor: Kan Takaiwa).
(Continued)

*Primary Examiner* — Lin Ye
*Assistant Examiner* — Fayez A Bhuiyan
(74) *Attorney, Agent, or Firm* — Venable LLP

(57) ABSTRACT

An image capturing apparatus that is able to suppress decreases in image quality even during image capturing with a low illuminance, wherein the image capturing apparatus includes a photoelectric conversion element having an avalanche photodiode; a signal processing unit configured to perform correction on a signal that has been acquired by the photoelectric conversion element based on position information for a pixel that becomes a correction target; and a control unit configured to control a number of pulses for a pulse signal during a period in which a signal is acquired for one frame; wherein a threshold for the signal processing unit to determine whether or not the correction will be performed on a signal is different in a first mode and a second mode, wherein the number of pulses for the pulse signal is less in the second mode than in the first mode.

18 Claims, 23 Drawing Sheets

(51) Int. Cl.
*H04N 23/667* (2023.01)
*H04N 25/683* (2023.01)

(56) References Cited

U.S. PATENT DOCUMENTS

| | | | | |
|---|---|---|---|---|
| 9,402,041 | B2 | 7/2016 | Numata | |
| 10,165,215 | B2 | 12/2018 | Numata | |
| 2019/0305146 | A1 | 10/2019 | Kuroda | |
| 2020/0412989 | A1* | 12/2020 | Kuroda | H10F 39/12 |
| 2022/0216251 | A1 | 7/2022 | Morimoto | |
| 2024/0107192 | A1 | 3/2024 | Numata | |
| 2024/0107199 | A1 | 3/2024 | Numata | |

OTHER PUBLICATIONS

U.S. Appl. No. 18/443,556, filed Feb. 16, 2024 (First Named Inventor: Ryota Sando).
Search Report dated Jun. 4, 2024, in European Patent Application No. 24155221.5.

* cited by examiner

Defective pixel type: K1

| Control settings | Threshold |
| --- | --- |
| M1 | TH1 |
| M2 | TH2 |
| M3 | TH3 |
| ⋮ | ⋮ |

FIG. 3B

Defective pixel type: K2

| Control settings | Threshold |
| --- | --- |
| M1 | TH1 |
| M2 | TH2 |
| M3 | TH3 |
| ⋮ | ⋮ |

21
403
413
414
411
412
410
415
515

413
403
511
512
513
514
402
VL
501
node A
node B
510
502
VH
CLK
515

CLK
INCIDENCE OF PHOTONS
node A
node B
OUT
DETERMINATION THRESHOLD
t1
t2
t3
t4
t5
t6
n
n+1
n+2

401a
401b
401c
X

RELATIVE OUTPUT
POSITION X

401a
X

RELATIVE OUTPUT
SIGNAL LEVEL
POSITION X

401a
X

RELATIVE OUTPUT
SIGNAL LEVEL
POSITION X

OUTPUT COUNT NUMBER

INPUT SIGNAL NUMBER

SIGNAL LEVEL

DEFECT OUTPUT LEVEL

401a
X

RELATIVE OUTPUT
SIGNAL LEVEL
POSITION X

401a
X

RELATIVE OUTPUT
SIGNAL LEVEL
POSITION X

RELATIVE OUTPUT
SIGNAL LEVEL
DEFECTIVE PIXEL ADJACENT PIXEL LEVEL
L1
POSITION X

RELATIVE OUTPUT
SIGNAL LEVEL
DEFECTIVE PIXEL ADJACENT PIXEL LEVEL
L2
POSITION X

| Defect amount | Address | Defect type | Number of pulses |
| --- | --- | --- | --- |
| Z1 | (X1, Y1) | K1 | N1 |
| Z2 | (X2, Y2) | K1 | N1 |
| Z3 | (X3, Y3) | K1 | N1 |
| Z4 | (X4, Y4) | K1 | N1 |
| Z5 | (X5, Y5) | K1 | N1 |
| Z6 | (X6, Y6) | K1 | N1 |
| Z7 | (X7, Y7) | K1 | N1 |
| Z8 | (X8, Y8) | K1 | N1 |

FIG. 22A

| Defect amount | Address | Defect type | Number of pulses |
|---|---|---|---|
| Z1 | (X1, Y1) | K1 | N1 |
| Z2 | (X2, Y2) | K1 | N1 |
| Z3 | (X3, Y3) | K1 | N1 |
| Z4 | (X4, Y4) | K1 | N1 |
| Z5 | (X5, Y5) | K1 | N1 |
| Z6 | (X6, Y6) | K1 | N1 |
| Z7 | (X7, Y7) | K1 | N1 |
| Z8 | (X8, Y8) | K1 | N1 |

FIG. 22B

| Defect amount | Address | Defect type | Number of pulses |
|---|---|---|---|
| W1 | (X9, Y9) | K1 | Nn |
| W2 | (X10, Y10) | K1 | Nn |
| W3 | (X11, Y11) | K1 | Nn |
| W4 | (X12, Y12) | K1 | Nn |
| W5 | (X13, Y13) | K1 | Nn |
| W6 | (X14, Y14) | K1 | Nn |
| W7 | (X15, Y15) | K1 | Nn |
| W8 | (X16, Y16) | K1 | Nn |

FIG. 23

IMAGE CAPTURING APPARATUS, CONTROL METHOD FOR IMAGE CAPTURING APPARATUS, AND STORAGE MEDIUM

BACKGROUND OF THE INVENTION

Field of the Invention

The present invention relates to an image capturing apparatus, a control method for an image capturing apparatus, a storage medium, and the like.

Description of the Related Art

In recent years, photoelectric conversion apparatuses have been proposed that digitally count a number of photons that reach an avalanche photodiode (APD) and output this counted value from a pixel to serve as a digital signal that has been photoelectrically converted.

In the configuration in Japanese Unexamined Patent Application, First Publication No. 2022-106649, a pixel comprising an APD is provided with an APD, a quenching circuit connected to the APD, a signal control circuit into which the signal output from the APD is input, and a pulse generating circuit that is connected to the quenching circuit and the signal control circuit.

In addition, a control method for a pulse signal that is input into the quenching circuit in a case in which there are a plurality of drive modes is also taught. For example, there are disclosures in relation to how the number of pulse signals, and the cycles are made in a first mode, and in a second mode in which image capturing is performed in a darker environment than in the first mode (image capturing with a low illuminance).

In addition to a signal based on photoelectric conversion according to incident light, a signal for a pixel comprising an APD also includes a signal caused by abnormalities in the trap level for the pixel. A pixel will exist for which there is a higher amount of occurrence of signals caused by abnormalities in the trap level for the pixel in comparison to the surrounding pixels (referred to below as a “defective pixel”).

This defective pixel also generates a charge on the adjacent pixels, and generates a cluster-type defect (referred to below as a “cluster defect”). In addition, there is a higher chance of cluster defects occurring for image capturing with a low illuminance than there is for image capturing in an environment that is brighter than that in the second mode (high illuminance image capturing).

In particular, when performing image capturing after switching from high illuminance image capturing to low illuminance image capturing, if the number of drive pulse signals is made the same, the possibility of cluster defects occurring increases. If a signal that has been output from a cluster defect is used as is to form an image, image quality deterioration (a decrease in image quality) will occur.

In this context, for example, storing the information such as the addresses of defective pixels within the image capturing element (referred to below as “defect information”) on a nonvolatile memory at the time of shipment from the factory, and correcting defect pixels by referring to the defect information at the time of actual image capturing is known.

However, Japanese Unexamined Patent Application, First Publication No. 2022-106649 does not disclose a detection and correction method for defective pixels with respect to an acquired signal in a case in which there is a plurality of image capturing modes. In addition, it also does not disclose how cases are handled when high illuminance image capturing has been switched to low illuminance image capturing.

SUMMARY OF THE INVENTION

As one aspect of the present invention, there is an image capturing apparatus comprising: a photoelectric conversion element that comprises an avalanche photodiode; at least one processor; and a memory coupled to the at least one processor, the memory storing instructions that, when executed by the at least one processor, cause the at least one processor to:

acquire a signal from the photoelectric conversion element;

perform correction processing on the signal based on position information for a pixel that is determined as a correction target; and control a number of pulses for a pulse signal during a period in which the signal is acquired for one frame; wherein a threshold for determining whether or not the correction processing will be performed on the signal is different in a first mode and in a second mode, wherein the number of pulses for the pulse signal is less in the second mode than in the first mode.

Further features of the present invention will become apparent from the following description of embodiments with reference to the attached drawings.

BRIEF DESCRIPTION OF THE DRAWINGS

FIG. 1 is a diagram of a configuration of an image capturing apparatus according to a First Embodiment.

FIGS. 3A, and B are diagrams showing one example of a format for defective pixel threshold data for the defective pixel detecting unit according to the First Embodiment.

FIGS. 19 A, and B are diagrams of an image of a defect inside of a captured image and the data for the defective pixel in the First Embodiment.

FIGS. 22 A, and B are diagrams of data for a defective pixel according to a Second Embodiment.

FIG. 23 is a diagram of the internal configuration of a defective pixel detecting unit according to a Third Embodiment.

DESCRIPTION OF THE EMBODIMENTS

Figure 2:
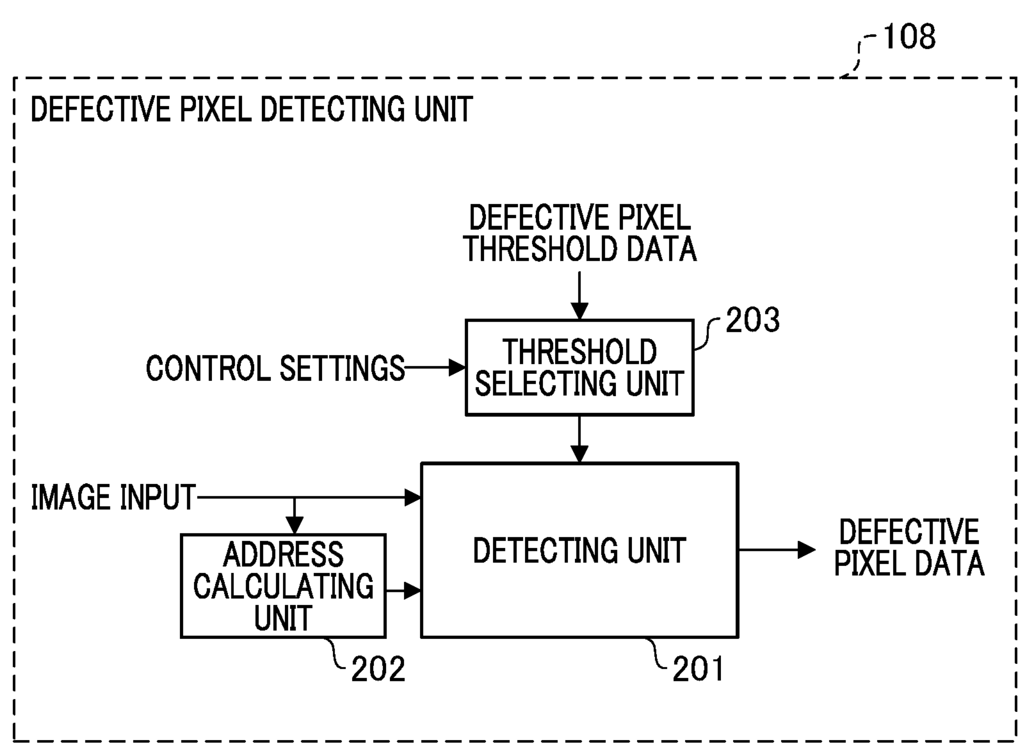
FIG. 2 is a diagram of an internal configuration for a defective pixel detecting unit according to the First Embodiment.

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
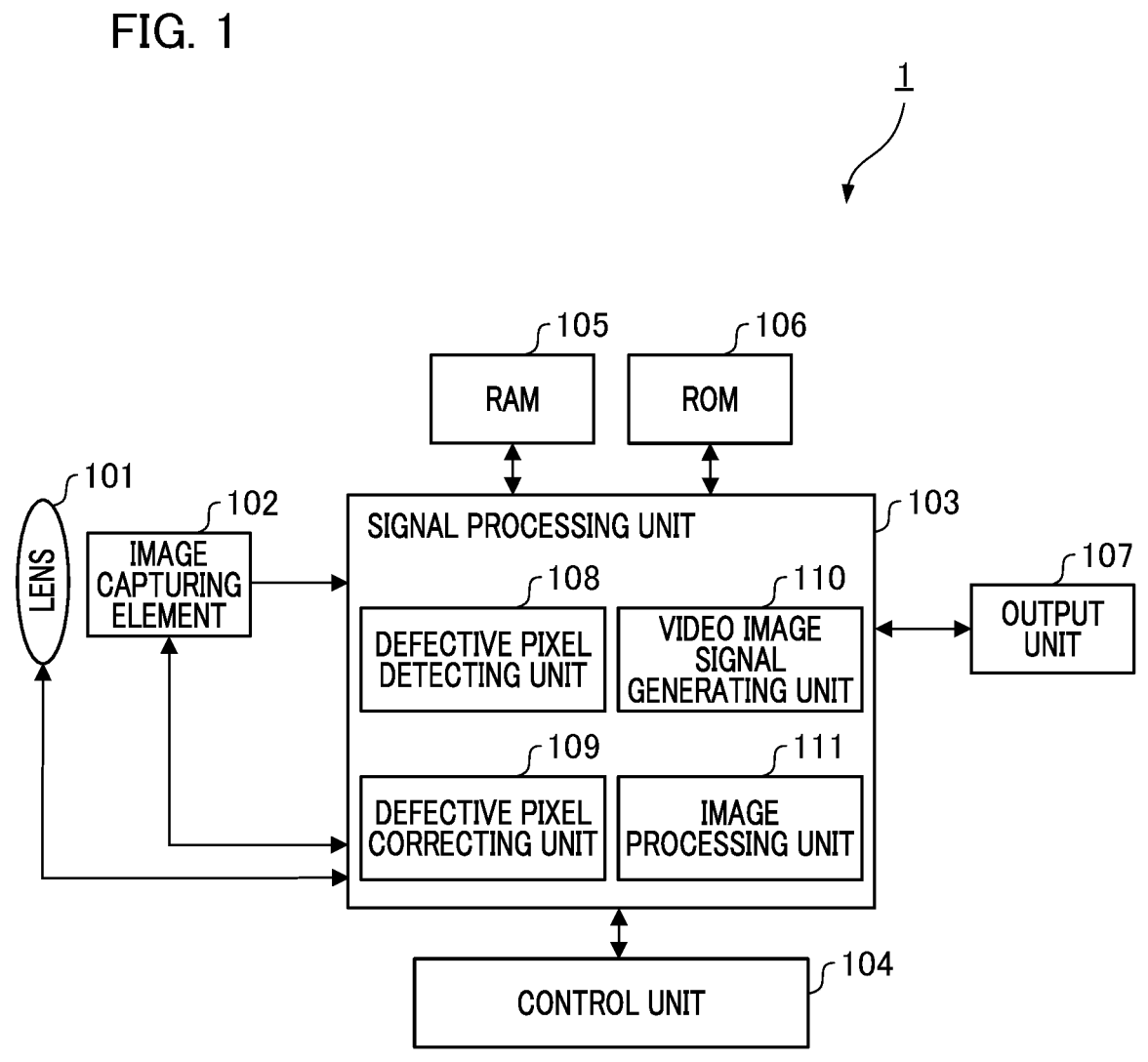

First, each block in an image capturing apparatus 1 of the First Embodiment will be explained below using FIG. 1. FIG. 1 is a block diagram of the image capturing apparatus 1 in the First Embodiment. The image capturing apparatus 1 is configured so as to include a lens 101, an image capturing element 102, a signal processing unit (video image signal processing unit) 103, a control unit 104, a RAM 105, a ROM 106, and an output unit 107.

The lens 101 is an image capturing optical system (image forming optical system) that forms an optical image of a subject, and includes a variable magnification lens (zoom lens) that moves in the direction of the optical axis at the time of variable magnification, and a focus lens that moves in the direction of the optical axis at the time of focus adjustment (focusing). In addition, the lens 101 is provided with an aperture and ND that control the amount of incident light, and an IRCF that controls the amount of incident infrared light.

The image capturing element 102 is a photoelectric conversion apparatus that photoelectrically converts an optical image that has been formed by the lens 101 into an electric signal. The image capturing element 102 in the First Embodiment is an image sensor that uses an avalanche photo diode (APD).

Figure 5:
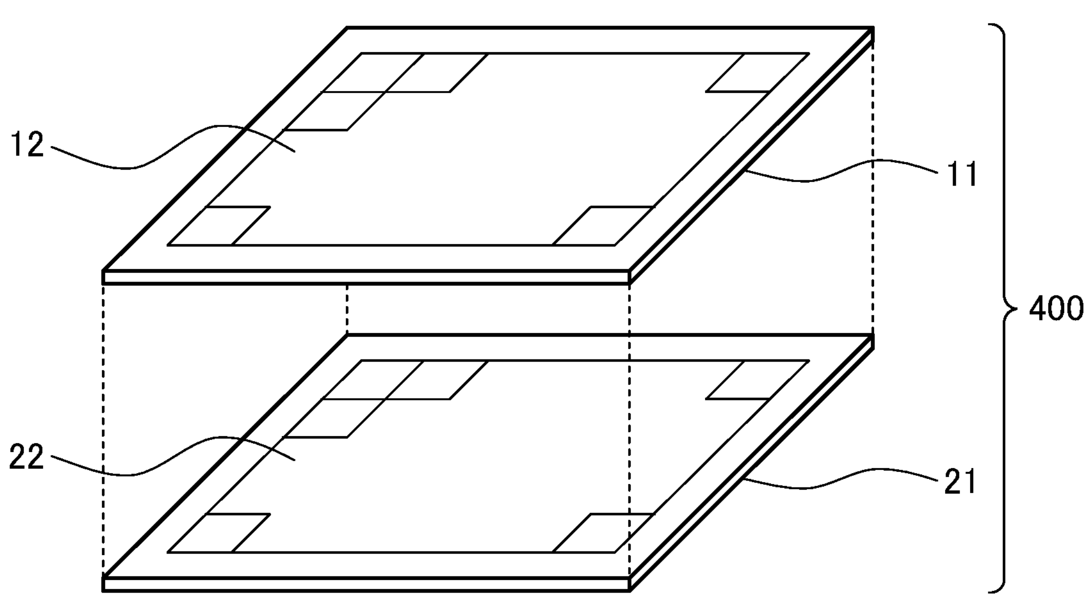
FIG. 5 is a diagram of a photoelectric conversion element according to the First Embodiment.

Specifically, this is a photoelectric conversion apparatus that has been configured so as to include a photoelectric conversion element 400, which is shown in FIG. 5 and will be described below. An optical image that has been obtained by exposure is externally output by each pixel to serve as an image signal. In the First Embodiment, these are output to the signal processing unit 103. Note that the details and operations of the image capturing element 102 will be described below.

The signal processing unit 103 is configured so as to include, as functional units, a defective pixel detecting unit 108, a defective pixel correcting unit 109, a video image signal generating unit 110, and an image processing unit 111. Each of these functional units is realized by the control unit 104, which will be described below, decompressing programs that have been stored on the ROM 106 and the RAM 105, and executing these. In addition, the control unit 104 stores the execution results for each of the processing, which are to be explained below, on the RAM 105 or a predetermined storage medium.

The signal processing unit 103 executes correction processing on a signal that has been acquired by the photoelectric conversion element 400 to be explained below based on position information for a pixel (the defective pixel) that becomes the correction target by using each of the functional units described above. In addition, it generates a video image signal in a predetermined format based on a pixel signal with a frame as its unit that has been corrected. Note that the signal processing unit 103 can apply a gain (a digital gain) to and correct a signal that has been obtained by the photoelectric conversion element 400, which will be explained below.

The defective pixel detecting unit 108 performs a detection for a defective pixel, which is a pixel that requires correction, from the output of the image capturing element 102. Specifically, it uses the pixel signal that has been output from the image capturing element 102, and detects defects that are included in each signal. The defective pixel detecting unit 108 stores (records) defect information that is generated based on defective pixel data (pixel information), which is the results that have been detected for each pixel, on the RAM 105, the ROM 106, or the like.

The defective pixel correcting unit 109 executes correction processing based on the results for the defective pixel detecting unit 108 at the unit of a frame in relation to the pixel signal that the image capturing element 102 has output. That is, the defective pixel correcting unit 109 corrects defective pixels using defect information that is generated based on defective pixel data that has been detected by the defective pixel detecting unit 108 in relation to the signals (image capturing signals) that have been acquired by the photoelectric conversion element 400, which will be described below.

More specifically, in order to be used in defect correction by the defective pixel correcting unit 109, defect correction data that has been selected from among the defect information that has been stored on the RAM 105, the ROM 106, or the like, which will be described below, is used and correction is performed.

This selection is performed by the control unit 104 based on the image capturing conditions (ISO sensitivity, and exposure time), the temperature of the image capturing element 102, a plurality of drive modes in which the number of pulses for the pulse signal during the exposure period in which the signal for one frame of the image capturing element 102 is acquired is different, and the like.

The video image signal generating unit 110 generates a video image signal in a predetermined format based on a pixel signal with a frame as a unit that has been corrected by the defective pixel correcting unit 109. The image processing unit 111 performs arbitrary image processing and analysis processing on the image signals and video image signals and outputs these to each block. Note that it may also be made such that the image processing unit 111 applies a gain to the above-described signals and corrects them.

The signal processing unit 103 includes aberration correction processing that further corrects optical aberrations of the lens 101, noise reduction processing (not illustrated) for reducing fixed pattern noise and random noise in relation to the pixel signal that is output from the image capturing element 102, and the like. In addition, the signal processing unit 103 may also be configured so as to include a digital signal processing unit that performs compression and encoding processing on the video image signal after each type of correction has been performed on the pixel signal.

The control unit 104 is a central processing unit that controls the entirety of the image capturing apparatus 1. The control unit 104 comprises a CPU that controls each type of operation processing and the entirety of the image capturing apparatus 1. This CPU performs the integral control of each configurational element in order to control the entirety of the image capturing apparatus 1, and sets each type of settings parameter and the like.

The CPU executes processing in the signal processing unit 103 and each functional unit that is included in the signal processing unit 103. In addition, the CPU includes a cash memory that electronically writes and erases data, or the like, and executes programs that have been stored thereon. Note that the memory is used as a storage area for programs executed by this CPU, a work area for programs being executed, a storage area for data, and the like.

The control unit 104 calculates setting values for the image capturing element 102 and the lens 101, the exposure, the number of pulses for the control signal CLK for the image sensor, and the like, based on analysis results for each signal that is output by the signal processing unit 103. Specifically, a stored program diagram is used based on the illuminance for the subject that is included in results that have been analyzed in the signal processing unit 103.

In addition, the exposure time that is set in the image capturing element 102, and the parameters relating to the exposure such as the F value for the aperture that is included in the lens 101, and the like, are determined. Note that although each type of operation and detection processing, and each type of processing such as the correction processing and the like are performed in the signal processing unit 103, it may also be made such that a portion or the entirety of each type of operation and detection processing and each type of processing such as the correction processing and the like are performed in the control unit 104. The exposure time referenced in this context is the execution timing for the electronic shutter.

The RAM 105 temporarily stores operation results for the control unit 104 and the output signal for the signal processing unit 103. This may be provided separately from the cash memory that is included in the CPU, or this may be the same.

The ROM 106 stores the defect information and various adjustment values. Each type of data that is stored on the ROM 106 is decompressed on the RAM 105 at a predetermined timing such as at the time of being started up, or the like, by a control of the control unit 104.

The output unit 107 can output video images and images that have been captured to an external monitor and a recorder, and record these on a recording medium such as an SD card, a hard disk drive (HDD), a non-volatile memory, or the like. Conversely, it is also possible to output a video image signal via the internet. The internet connection may be wired or it may also use a wireless communication format such as wireless LAN or the like.

Note that the image capturing apparatus 1 may also be configured so as to have a recording medium such as the above-described hard disk or the like. In this case, the recording medium may be disposed inside of the image capturing apparatus 1, or it may also be made so as to be disposed outside of the image capturing apparatus 1 and electronically connected to the image capturing apparatus 1 via the output unit 107.

The image capturing apparatus 1 may also be configured so as to further have a display apparatus such as a monitor, a display, or the like. In this case, the display apparatus is electronically connected to the image capturing apparatus 1 via the output unit 107. Note that the recording medium and the display apparatus may also be connected to the image capturing apparatus 1 not via the output unit 107, but through another line instead.

Below, an explanation will be given of a detection method for a defective pixel with reference to FIG. 2 and FIG. 3. FIG. 2 is a diagram showing an example of an internal configuration for the defective pixel detecting unit 108. FIGS. 3A, and B are diagrams showing examples of formats for defective pixel threshold data for the defective pixel detecting unit 108. The defective pixel detecting unit 108 is configured so as to comprise a detecting unit 201, an address calculating unit 202, and a threshold selecting unit 203 as functional units.

The detecting unit (determining unit) 201 executes a determination for whether or not the pixel signal that has been acquired is a defective pixel. Specifically, a pixel signal that has been output from the image capturing element 102 is input to the detecting unit 201, and the detecting unit 201 determines whether or not each of the pixel signals that have been input are defective pixels.

That is, the detecting unit 201 determines whether or not a signal that has been acquired by the image capturing element 102 is a pixel that will become a correction target. After this, the defective pixel data, which is the determination result, is output and stored on the RAM 105, the ROM 106, or the like. The defective pixel data includes a defect amount, the address of the defective pixel, the type of defect, and the like.

In this context, the defect amount is an output value for a considered pixel. The defect amount may be the absolute value for the level of the pixel, or it may also be the difference between it and adjacent pixels. The address for a defective pixel represents the position inside of a pixel array of the image capturing element 102, and may use an absolute position format in which the horizontal coordinates and the vertical coordinates have been combined, or it may also use a relative position format that stores only the relative position (distance) between defective pixels in the signal scanning direction.

In addition, the type of defect is decided by the cause of the defect. For example, there are white defects for which the level is large in relation to the surrounding pixels, black defects in which the level in relation to the surround pixels is small, or the like. The conditions (image capturing conditions, environmental conditions, or the like) for the defect amounts for each defective pixel, which depend on the cause of this defect, are different. Therefore, pixel signals acquired using a plurality of image capturing conditions at the time of shipment from the factory, and the results of these are stored as the types of defects per condition.

The pixel signal that has been output from the image capturing apparatus 102 is input into the detecting unit 201, and at the same time as this, is input into the address calculating unit 202. Conversely, the pixel signal that has been output from the image capturing element 102 may also be input into the address calculating unit 202 in joint operation with the input of this into the detecting unit 201. The address calculating unit 202 counts the number of pixel signals that are input in the order of scanning for the image capturing element 102, and generates address information corresponding to the considered pixel signal, which becomes the defective pixel.

The threshold selecting unit 203 performs selection of a threshold to be used in the determination of whether or not a pixel is a defective pixel. The threshold selection unit 203 selects an appropriate threshold from threshold data for the defective pixel according to the control settings and the type of defect, which are settings information for the image capturing conditions, in the control unit 104. Note that the number of control settings values and thresholds corresponding thereto that is shown in FIG. 3 is an example, and can be appropriately changed.

FIG. 3 (A) is a diagram showing one example of threshold data in a K1 type defective pixel. FIG. 3 (B) is a diagram showing on example of threshold data in a K2 type defective pixel. The data that is shown in FIG. 3 (A) and FIG. 3 (B) both have the two elements of control settings and thresholds.

For example, in relation to the control setting M1, the threshold for the defective pixel is TH1, in relation to the control setting M2, the threshold for the defective pixel is TH2, and in relation to the control setting M3, the threshold for the defective pixel is TH3. Therefore, the threshold selecting unit 203 performs the selection of the threshold to be used in the determination of the defective pixel from among a plurality of thresholds that have been set in advance in this manner.

When the threshold is selected, the threshold selecting unit 203, for which the details will be described below, selects a threshold according to the number of pulses for the pulse signal for the control signal CLK. In addition, these thresholds are set such that the value for the threshold becomes smaller the more that the pulse signal for the control signal CLK decreases.

For example, at the time of the control setting M1, the pixel level for the detection target (the pixel that will become the correction target) in the defective pixel detecting unit 108 has surpassed the threshold TH1, that is, it is a pixel that is at or above the threshold TH1.

Therefore, when executing the determination for whether or not the pixel signal that has been output from the image capturing element 102 is a defective pixel, in a case in which this is a pixel for which the pixel level exceeds the threshold TH1, the defective pixel detecting unit 108 outputs the pixel that exceeds the threshold TH1 as the pixel to be made the correction target, that is, as a defective pixel.

In this manner, the defective pixel detecting unit 108 of the First Embodiment executes a determination for whether or not the pixel signal that has been output from the image capturing element 102 is a defective pixel based on the threshold that has been selected by the threshold selecting unit 203.

The control settings are the shutter speed (exposure time), the gain, the temperature, and the like, and an appropriate threshold is calculated and used in the detection of defective pixels according to these control settings. In addition, the defect amount differs according to the type of defect, and therefore, there is threshold data for each type of defect.

Figure 4:
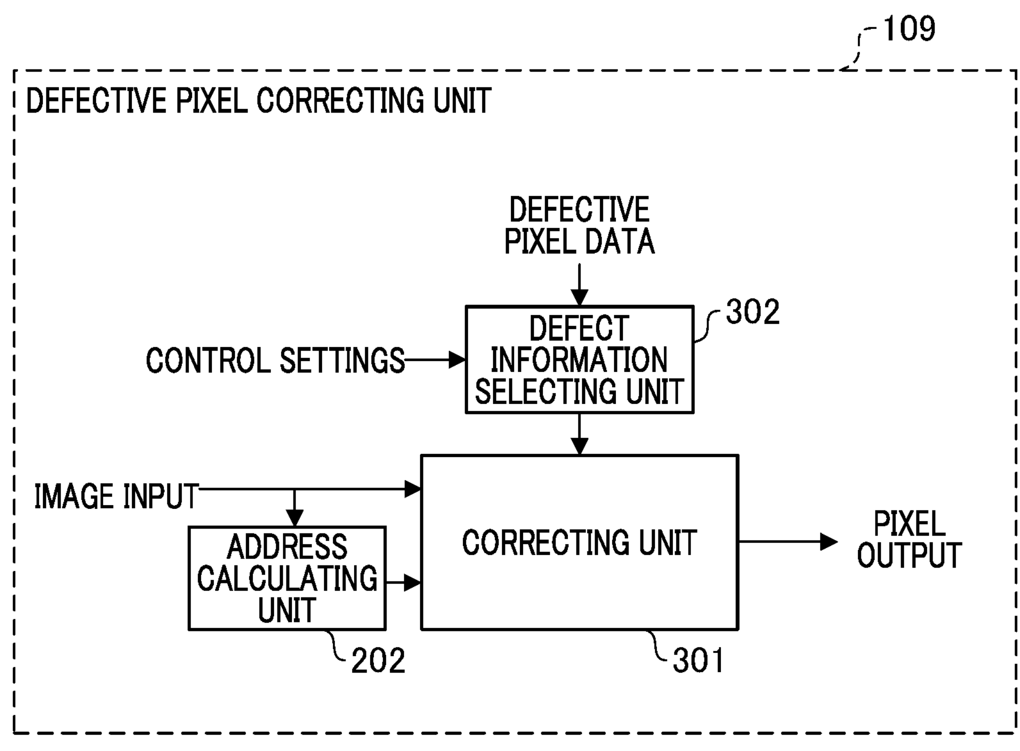
FIG. 4 is a diagram of an internal configuration of a defective pixel correcting unit according to the First Embodiment.

Below, an explanation will be given of the correction method for a defective pixel with reference to FIG. 4. FIG. 4 is a diagram showing one example of an internal configuration of the defective pixel correcting unit 109. The defective pixel correcting unit 109 is configured so as to comprise a correcting unit 301, the address calculating unit 202, and a defect information selecting unit (data selecting unit) 302 as functional units. The address calculating unit 202 is the same as the address calculating unit 202 that was described above, and therefore an explanation thereof will be omitted.

The correcting unit 301 corrects a defective pixel for a pixel signal that has been input from the image capturing element 102 from the pixel level for the surrounding pixels based on information that is included in the defect pixel data. After this, the correction results are output.

The defect information selecting unit 302 reads out defective pixel data that has been selected based on the control settings from the control unit 104 from the RAM 105, the ROM 106, or the like. After this, the defect information selecting unit 302 transmits the defective pixel data that has been read out to the correcting unit 301.

In addition, the correcting unit 301 specifies the position of the defective pixel from the address that has been input by the address calculating unit, and the address (address data) for the defective pixel data that was received from the defect information selecting unit 302, and extracts the correction target for the pixel signal. The correcting unit 301 performs correction on the extracted correction target using the surrounding pixels.

Below, an explanation will be given of the configuration for the photoelectric conversion apparatus that is shared by the First Embodiment and each embodiment shown below with reference to FIG. 5 through FIG. 8. FIG. 5 is a diagram showing a configurational example of the photoelectric conversion element 400 in the First Embodiment, which has been arranged in an RGB Bayer array.

Below, an explanation is given in which, as an example, the photoelectric conversion element 400 is a photoelectric conversion apparatus having a so-called laminated structure that is configured by the two boards of a sensor board 11 and a circuit board 21 being laminated together and electronically connected.

Note that this does not need to be a photoelectric conversion apparatus that is a so-called laminated structure, and may also be a photoelectric conversion apparatus having a so-called non-laminated structure in which a configuration included in the sensor board 11 and a configuration included in the circuit board 12 are arranged on the same semiconductor layer. In addition, as was explained above, the photoelectric conversion element 400 is included in the image capturing element 102, which also functions as a photoelectric conversion apparatus in the First Embodiment.

The sensor board 11 includes a pixel region 12 (the pixel region 12 is disposed therein). The circuit board 21 includes a circuit region 22 (the circuit region 22 is disposed therein) in which a signal that has been detected in the pixel region 12 is processed.

Figure 6:
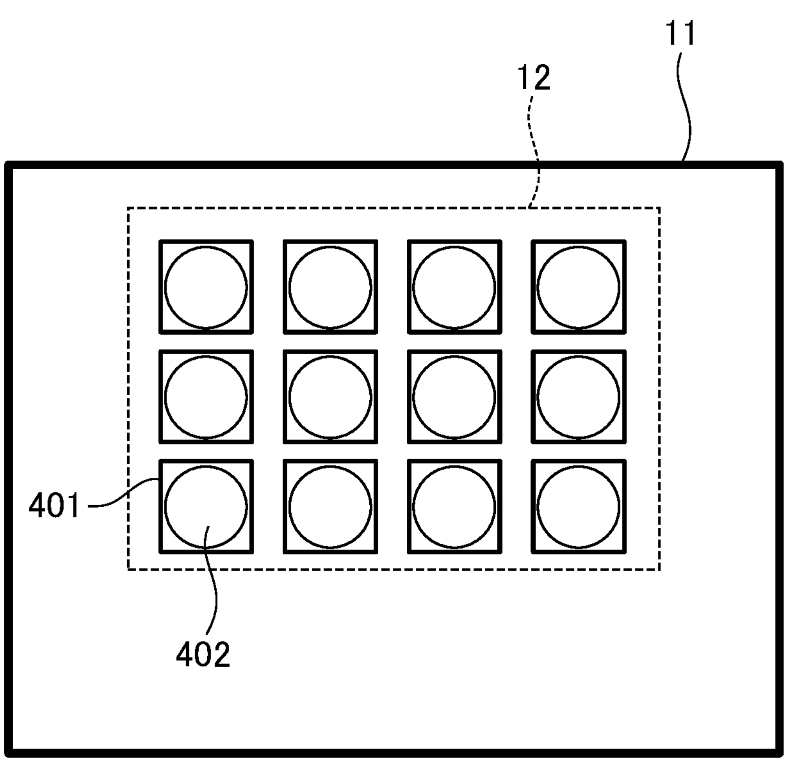
FIG. 6 is a diagram of a sensor board according to the First Embodiment.

FIG. 6 is a diagram showing a configurational example of the sensor board 11. The pixel region 12 of the sensor board 11 that is included in the photoelectric conversion element 400 comprises pixels 401 of which a plurality has been arranged two-dimensionally across a plurality of rows and in the column direction.

A pixels 401 is provided with a photoelectric conversion unit 402 that includes an avalanche photodiode (below, an APD). Note that the number of rows and the number of columns for the pixel array that forms the pixel region 12 that is shown in FIG. 6 is one example, and this number is not limited to the number shown in FIG. 6.

Figure 7:
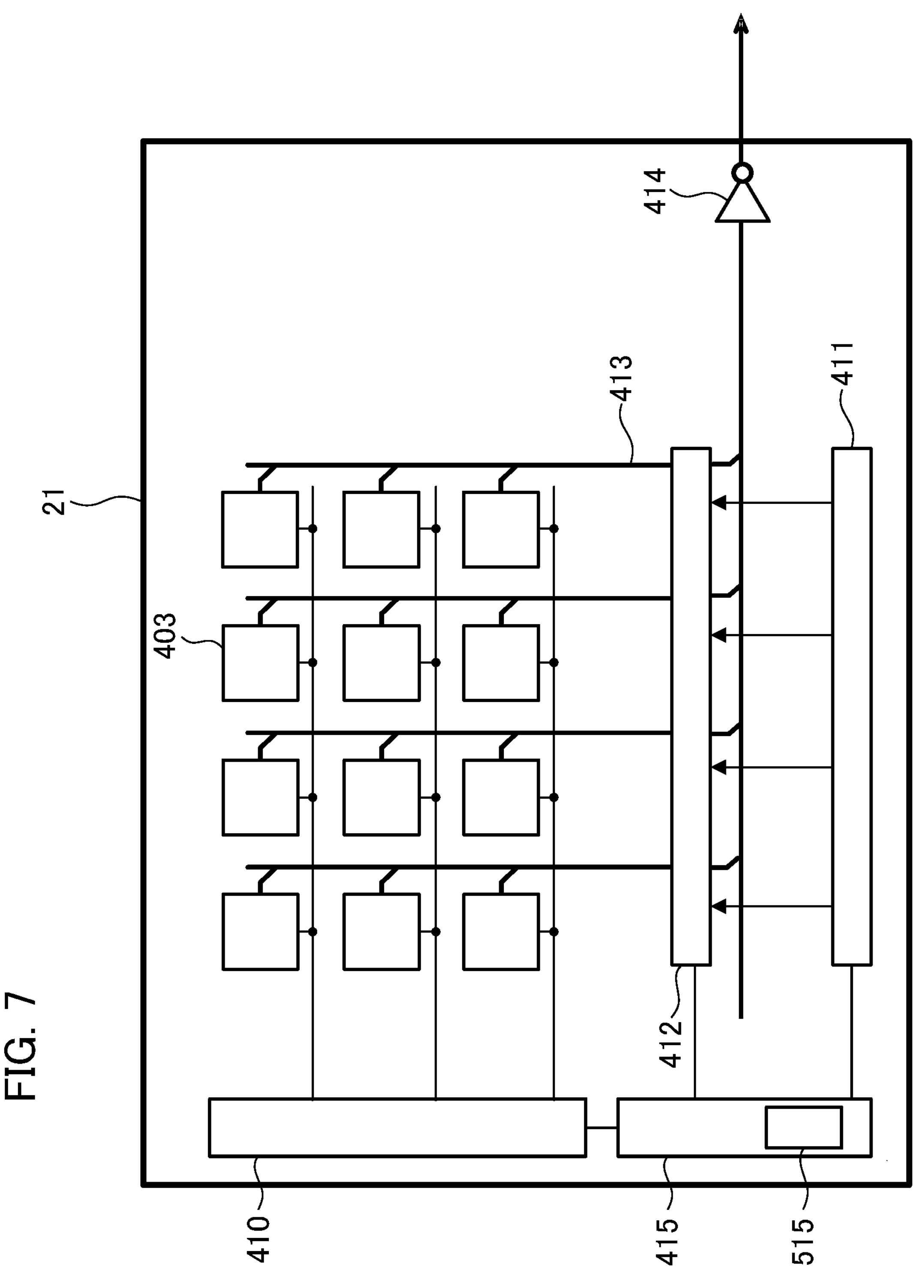
FIG. 7 is a diagram of a circuit board according to the First Embodiment.

FIG. 7 is a diagram showing a configurational example of the circuit board 21. The circuit board 21, which is included in the photoelectric conversion element 400, is configured so as to comprise a circuit board 21, a signal processing circuit 403, a vertical scanning circuit 410, a horizontal scanning circuit 411, a read out circuit 412, a signal line 413, an output circuit 414, and a control pulse generating unit 415. Note that the photoelectric conversion element 400 and the signal processing circuit 403 are electronically connected via connection lines that have been provided per pixel.

The signal processing circuit 403 processes the electric charge that has been photoelectrically converted in the photoelectric conversion unit 402 that is shown in FIG. 6.

The vertical scanning circuit 410 receives a control pulse that has been supplied from the control pulse generating unit 415, and supplies the control pulse to each pixel. The vertical scanning circuit 410 is configured from a shift resister and an address decoder that have been connected using a plurality of rows as one unit, and realize a high speed read out by reading out a plurality of rows at one time.

In particular, in the case of a photoelectric conversion apparatus that digitally counts the number of photons that reach an APD 501 and outputs the counted value from a pixel to serve as the photoelectrically converted digital signal, the operations for the counter circuit that digitally counts the number of photons takes time.

Therefore, it is preferable to read out a plurality of rows at the same time for a high speed read out. That is, the vertical scanning circuit 410, which functions as a read out circuit that reads out a pixel signal from a pixel 401 reads out pixel signals from the pixels 401 that are included in a plurality of rows from among the pixel region 12 at the same time.

The control pulse generating unit 415 has a signal generating unit 515 that generates a control signal CLK that controls the on and off of a switch 502 to be described below. That is, the signal generating unit 515 generates a pulse signal that serves as the control signal for controlling the switching of the switch 502.

The signal generating unit 515 is configured so as to be able to change at least one of the cycle, the number of pulses, or the pulse width for the pulse signal that controls the switch 502. The control pulse generating unit 415 preferably has, for example, a divider circuit. Simple control is thereby made possible, and increases in the number of elements can be suppressed.

The signal that has been output from the photoelectric conversion unit 402 of a pixel is processed in the signal processing circuit 403. The signal processing circuit 403 is provided with a counter, a memory, or the like, and the memory holds digital values.

The horizontal scanning circuit 411 inputs a control pulse that selects each column in order to the signal processing circuit 403 via the read out circuit 412 in order to read out a signal from the memory for each pixel, in which a digital signal is held.

The signal line 413 outputs a signal from the signal processing circuit 403 for the pixel that was selected by the vertical scanning circuit 410 with respect to the selected column. The signal that has been output by the signal line 413 is output to outside of the photoelectric conversion apparatus via the output circuit 414.

As is shown in FIG. 6 and FIG. 7, a plurality of signal processing circuits 403 are arranged in a region that overlaps with the pixel region 12 in a plane-view. Note that the plane-view indicates the view from the vertical direction in relation to the incident light surface of the semiconductor layer on which the photoelectric conversion element 400 is arranged. Note that in a case in which when viewed microscopically, the incident light surface of the semiconductor layer is a rough surface, the plane-view is defined using the incident light surface of the semiconductor layer when seen macroscopically as a reference.

In addition, the vertical scanning circuit 410, the horizontal scanning circuit 411, the read out circuit 412, the output circuit 414, and the control pulse generating unit 415 are arranged such that they overlap between the edge of the sensor board 11 and the edge of the pixel region 12 in the plane-view.

In other words, the sensor board 11 has the pixel region 12, and a non-pixel region that is arranged around the pixel region 12. In addition, the vertical scanning unit 410, the horizontal scanning unit 411, the read out circuit 412, the output circuit 414, and the control pulse generating unit 415 are arranged in a region that overlaps with the non-pixel region in the plane-view.

Note that the arrangement of the signal line 413, and the arrangements of the read out circuit 412, and the output circuit 414 are not limited to the arrangement format that is shown in FIG. 7 (the arrangement positions). For example, it may also be made such that the signal line 413 is arranged so as to extend in the direction of the rows, and that the read out circuit 412 and the signal line 413 are arranged at the end of this extension.

In addition, the functions of the signal processing unit do not necessarily need to be provided to each of the photoelectric conversion units, and this may be made a configuration in which one signal processing unit is shared by a plurality of photoelectric conversion units, and signal processing is performed in order.

Figure 8:
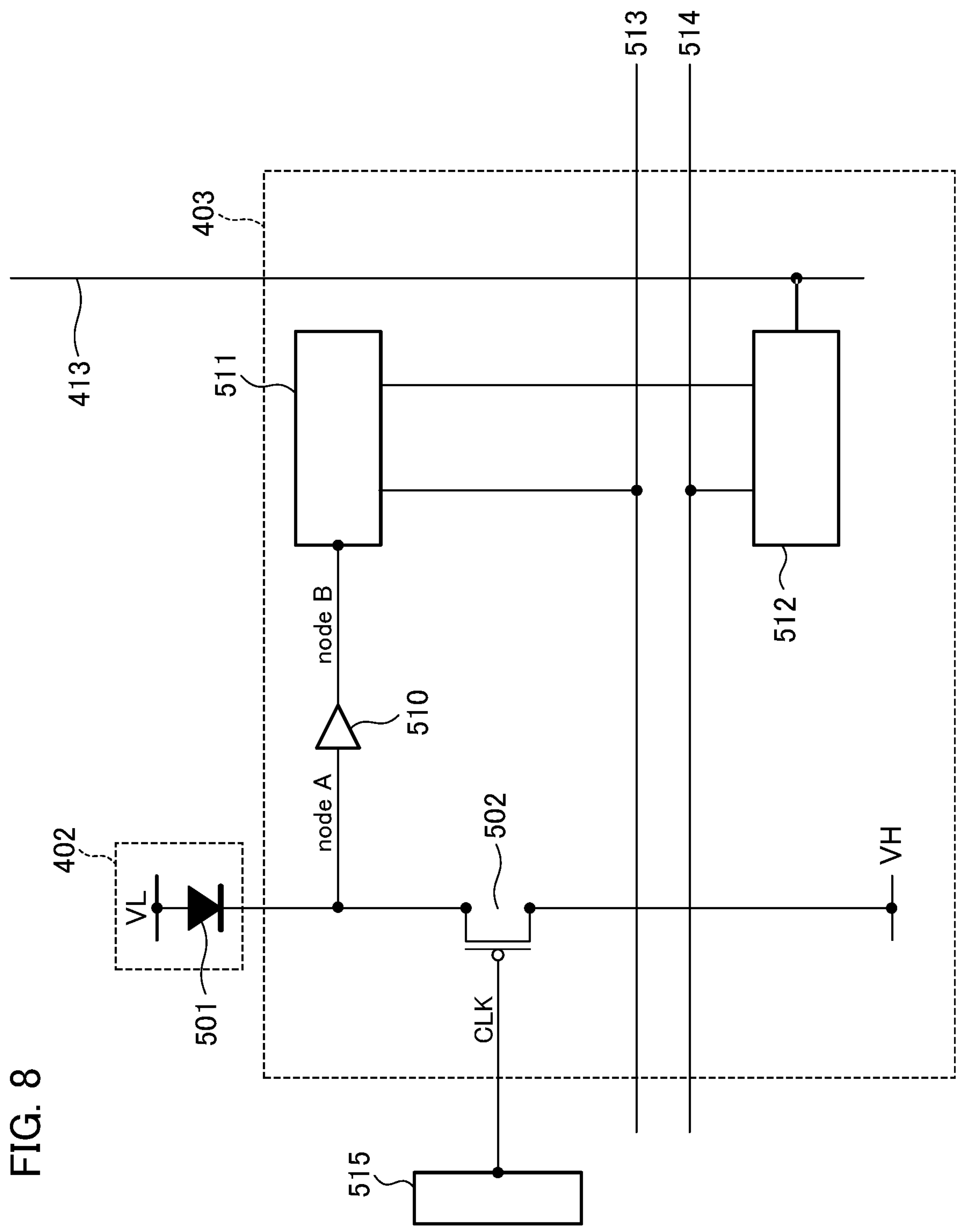
FIG. 8 is a diagram of an equivalent circuit corresponding to a pixel of the photoelectric conversion element according to the First Embodiment.

FIG. 8 is a diagram showing an example of, from among FIG. 6, and FIG. 7, a pixel 401 and an equivalent circuit for the signal processing circuit 403 corresponding to the pixel 401.

The APD 501 generates a charge pair according to the incident light from photoelectric conversion. One of the nodes from among the two nodes of the APD 501 is connected to a power source line that provides a drive voltage VL (a first voltage). In addition, the other node from among the two nodes of the APD 501 is connected to a power source line that provides a drive voltage VH that is higher than the voltage VL (a second voltage).

In FIG. 8, one node of the APD 501 is an anode, and the other node of the APD 501 is a cathode. The anode and cathode of the APD 501 are supplied with a reverse bias voltage such that the APD 501 performs avalanche multiplication operations. When this is made a state in which such a voltage has been supplied, the electric charge caused by the incident light causes avalanche multiplication, and an avalanche current is generated.

Note that in the case in which a reverse bias voltage is supplied, there is a Geiger mode in which the APD is operated with a voltage difference for the anode and the cathode being larger than the breakdown voltage, and a linear mode in which the APD is operated with a difference in voltage between the anode and the cathode being in the vicinity of the breakdown voltage, or lower than this. An APD that is being operated in Geiger mode is referred to as a SPAD. In the case of a SPAD, the voltage VL (first voltage) is, for example −30V, and the voltage VH (second voltage), is, for example, 1V.

The switch 502 is connected to the power source line that supplies (applies) the drive voltage VH, and one node from among the anode and the cathode of the APD 501. In addition, the switch 502 switches the resistance value between the APD 501 and the power source line that supplies the drive voltage VH.

That is, the switch 502 switches the resistance value between one node from among the anode and the cathode of the APD 501 and the power source line that supplies (applies) the drive voltage VH. In this context, it is preferable if switching the resistance vale is changing the resistance value by tenfold or greater, or more preferably, changing the resistance value by a hundredfold or more.

Below, this resistance value becoming low is referred to as the switch 502 being on, and this resistance value becoming high is referred to as the switch 502 being off. The switch 502 functions as a quenching element.

The switch 502 functions as a load circuit (a quenching circuit) at the time of signal multiplication by avalanche multiplication, and has the function of suppressing the voltage that is supplied to the APD 501, and suppressing the avalanche multiplication (a quenching operation). In addition, the switch 502 has the function of returning the voltage that is supplied to the APD 501 to the drive voltage VH (a recharging operation) by flowing a current for the amount that was voltage dropped during the quenching operation.

The switch 502 can be configured by a MOS transistor. The example shown in FIG. 8 illustrates a case in which the switch 502 is a PMOS transistor. The control signal CLK of the switch 502 that is supplied from the signal generating unit 515 is applied to the gate electrode of the MOS transistor that configures the switch 502.

In the First Embodiment, the on and off state of the switch 502 is controlled by controlling the voltage that is applied to the gate electrode of the switch 502.

The signal processing circuit 403 is configured so as to have a waveform shaping unit 510, a counter circuit 511, and a selection circuit 512. Note that the example in FIG. 8 illustrates a case in which the signal processing circuit 403 has the waveform shaping unit 510, the counter circuit 511, and the selection circuit 512. However, it is sufficient if the signal processing circuit 403 has at least one of the waveform shaping unit 510, the counter circuit 511, and the selection circuit 512.

The waveform shaping unit 510 shapes the voltage changes of the cathode of the APD 501 that are obtained at the time of photon detection, and outputs a pulse signal, the input-side node of the waveform shaping unit 510 is made a node A, and the output-side node is made the node B.

Figure 9:
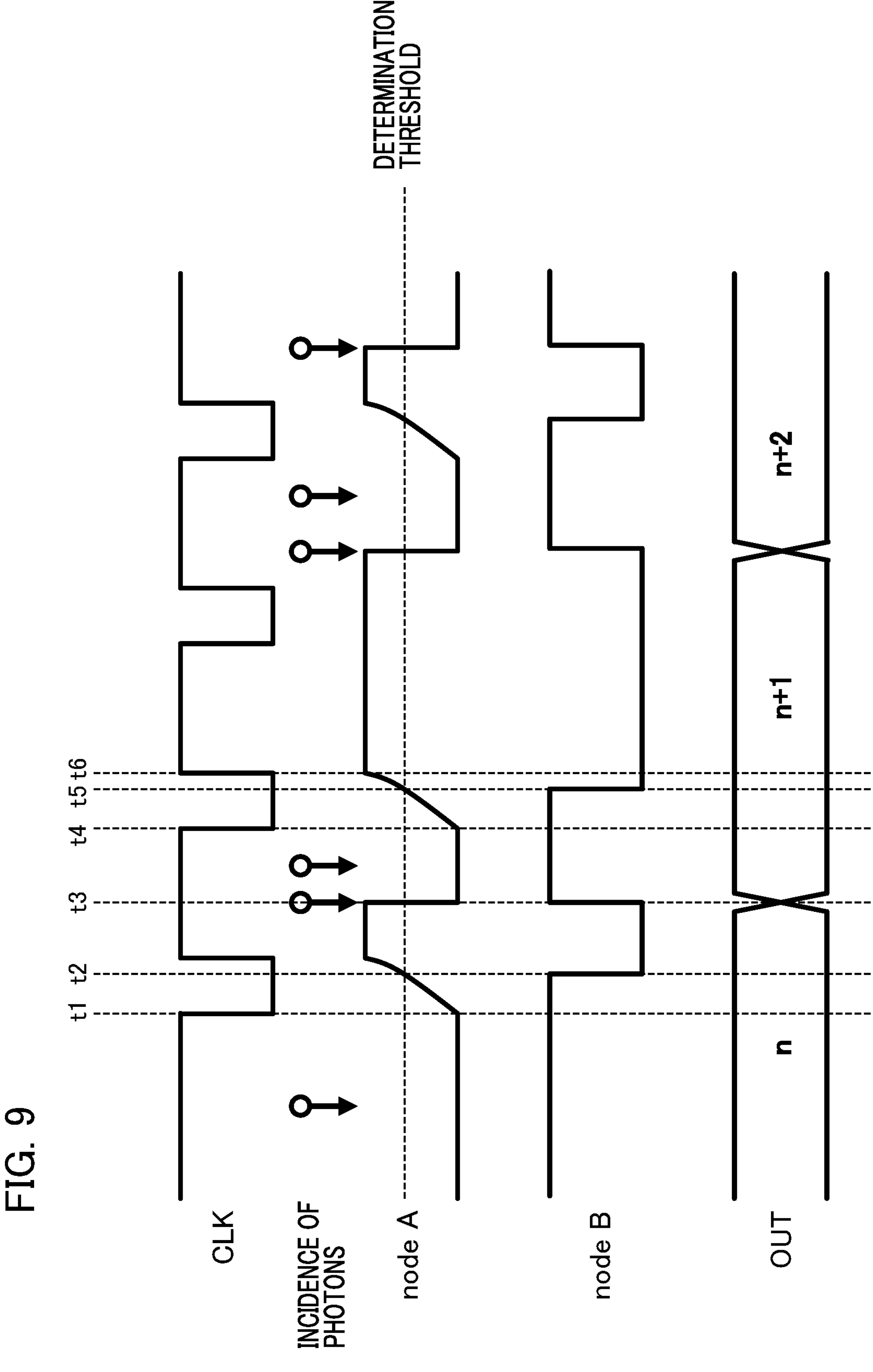
FIG. 9 is a diagram of a timing chart for the photoelectric conversion element according to the First Embodiment.

The waveform shaping unit 510 changes the voltage that is output from the node B according to if the voltage input into the node A is at or above a predetermined value, or if this is less than the predetermined value. For example, in the example that is shown in FIG. 9, if the voltage that is input into the node A is a voltage that is at or above a determination threshold, the voltage that is output from the node B becomes a low level.

In addition, if the voltage that is input into the node A is a voltage that is lower than the determination threshold, the voltage that is output from the node B becomes a high level. For example, an inverter circuit is used as the waveform shaping unit 510.

Although in the example shown in FIG. 8, an example has been given in which one inverter is used as the waveform shaping unit 510, a circuit in which a plurality of inverters are series connected may also be used, or another type of circuit having a waveform shaping effect may also be used.

The counter circuit 511 counts a pulse signal that has been output from the waveform shaping unit 510, and holds a count value. In addition, when a control pulse RES has been supplied thereto via a drive line 513, the signal that has been held in the counter circuit 511 is reset.

A control pulse SEL is supplied to the selection circuit 512 from the vertical scanning circuit 410 that is shown in FIG. 7 via a drive line 514 that is shown in FIG. 8 (which is not illustrated in FIG. 7), and switches the counter circuit 511 and the signal line 413 between being connected and not connected.

The selection circuit 512 may also include, for example, a buffer circuit for outputting a signal, or the like. The output signal OUT that is shown in FIG. 8 is a signal that is output from a pixel. Note that a switch such as a transistor or the like may also be disposed between the switch 502 and the APD 501, and between the photoelectric conversion unit 402 and the signal processing circuit 302, and the electrical connections therebetween may be switched.

In the same manner, the supply of the voltage VH or the voltage VL that are supplied to the photoelectric conversion unit 402 may also be electrically switched using a switch such as a transistor or the like.

Although it is possible to perform quenching operations and recharging operations using the switch 502 according to the avalanche multiplication in the APD 501, there are cases in which a photon cannot be determined to be an output signal due to the timing of its detection. For example, a case is assumed in which avalanche multiplication occurs in the APD 501, the voltage input to the node A becomes a low level, and a recharge operation is performed.

Generally, the determination threshold for the waveform shaping unit 510 is set to a higher voltage than the voltage difference caused by avalanche multiplication in the APD 501. If a photon becomes incident on the APD in a state in which the voltage of the node A is lower than the determination threshold due to a recharge operation and when there is a voltage for which avalanche multiplication is possible in the APD 501, avalanche multiplication will occur in the APD 501 and the voltage for the node A will decrease.

That is, the voltage for the node A will decrease by a voltage that is lower than the determination threshold, and therefore, regardless of whether or not a photon is detected, the output voltage from the node B will not change. Therefore, regardless of whether avalanche multiplication is occurring, this is no longer determined to be a signal.

In particular, under a high degree of illuminance, photons enter the APD continuously for a short period of time, and it therefore becomes difficult to determine that these are signals It thereby becomes easy for there to be a deviation between the actual number of photons that have become incident on the APD and the signals that have been output regardless of the high level of illuminance.

In relation to this, it becomes possible to determine that the photons are signals even in a case in which they enter the APD 501 continuously for a short period of time by switching the switch 502 on and off by applying the control signal CLK to the switch 502. In FIG. 9, an example is explained in which the control signal CLK is a pulse signal for a repetition cycle.

FIG. 9 is a diagram that schematically shows the relationship between the control signal CLK for the switch, the voltage for the node A, the voltage for the node B, and the output signal. Note that the t that is shown in FIG. 9 shows the time. In the photoelectric conversion apparatus in the First Embodiment, in a case in which the control signal CLK is at a high level, this becomes a state in which it is difficult to supply the drive voltage VH to the APD 501, and in a case in which the control signal CLK is at a low level, this becomes a state in which the drive voltage VH is supplied to the APD 501.

A high level for the control signal CLK is, for example, 1V, and a low level for the control signal CLK is, for example, 0V. In addition, in a case in which the control signal CLK is at a high level, the switch is turned off, and in a case in which the control signal CLK is at a high level, the switch is turned on. In addition, in a case in which the control signal CLK is at a high level, the resistance value for the switch becomes higher than the resistance value for the switch in a case in which the control signal CLK is at a low level.

In a case in which the control signal CLK is at a high level, even if avalanche multiplication occurs in the APD 501, it becomes difficult to perform a recharge operation, and therefore, the voltage that is supplied to the APD 501 becomes a voltage that is lower than the drop voltage for the APD 501. Therefore, avalanche multiplication operations in the APD 501 are stopped.

During the time t1, the control signal CLK changes from a high level to a low level, the switch is turned on, and the recharge operation for the APD 501 is begun. The voltage of the cathode for the APD 501 thereby transitions to a high level.

In addition, the voltage difference for the voltages that are applied to the anode and the cathode of the APD 501 becomes a state in which avalanche multiplication is possible. The voltage for the cathode is the same as that for the node A. Therefore, when the voltage for the cathode transitions from a low level to a high level, during the time t2, the voltage for the node A is at or above the determination threshold.

At this time, the pulse signal that is output from the node B is reversed, and goes from a high level to a low level. When recharging is completed, this becomes a state in which a voltage difference of the drive voltage VH—the drive voltage VL is applied to the APD 501. After this, the control signal CLK becomes a high level, and the switch is turned off.

Next, during the time t3, when a photon becomes incident on the APD 501, avalanche multiplication occurs in the APD 501, an avalanche multiplication current flows through the switch 502, and the voltage for the cathode is dropped. That is, the voltage for the node A is dropped.

If the voltage for the node A becomes lower than the determination threshold while the voltage for the node A is being dropped, the voltage for the node B goes from a low level to a high level. That is, the portion of the output waveform in the node A that has exceeded the determination threshold is waveform shaped by the waveform shaping unit 510, and output as a signal in the node B. In addition, counting is performed in the counter circuit 511, and the count value for the counter signal that is output from the counter circuit 511 is increased by 1LSB.

Note that although as is shown in FIG. 9, photons are becoming incident on the APD 501 between the time3 and the time4, at this point in time, the switch is in an off state, and the voltage that is applied to the APD 501 is not at a voltage difference for which avalanche multiplication can be performed. Therefore, in this state, the voltage level for the node A does not exceed the determination threshold.

During the time t4, the control signal CLK changes from a high level to a low level, and the switch is turned on. Due to this, a current that compensates for the voltage drop amount from the drive voltage VL is flowed through the node A, and the voltage for the node A transitions to its original voltage level. At this time, during the time t5, the voltage for the node A becomes equal to or greater than the determination threshold, and therefore, the pulse signal for the node B is reversed, and goes from a high level to a low level.

During the time t6, the node A becomes statically determinate at its original voltage, and the control signal CLK goes from a low level to a high level. After this as well, the voltage for each node, the signal line, and the like change according to the control signal CLK and the incidence of photons, as was explained for during the time t1 to the time t6.

In this manner, it is possible to control the recharging frequency for the APD 501 by switching the switch 502 on and off by applying the control signal CLK to the switch 502. As will be explained below, the image quality in a dark environment (at the time of image capturing with a low illuminance) is increased by controlling the timing of the control signal CLK to the switch.

First, the interpixel crosstalk will be explained using FIG. 10. FIGS. 10 A, and B are diagrams explaining interpixel crosstalk according to the First Embodiment. FIG. 10 A is a diagram showing output distribution for 5×5 pixels in the pixel region.

Figures 10A, 10B:
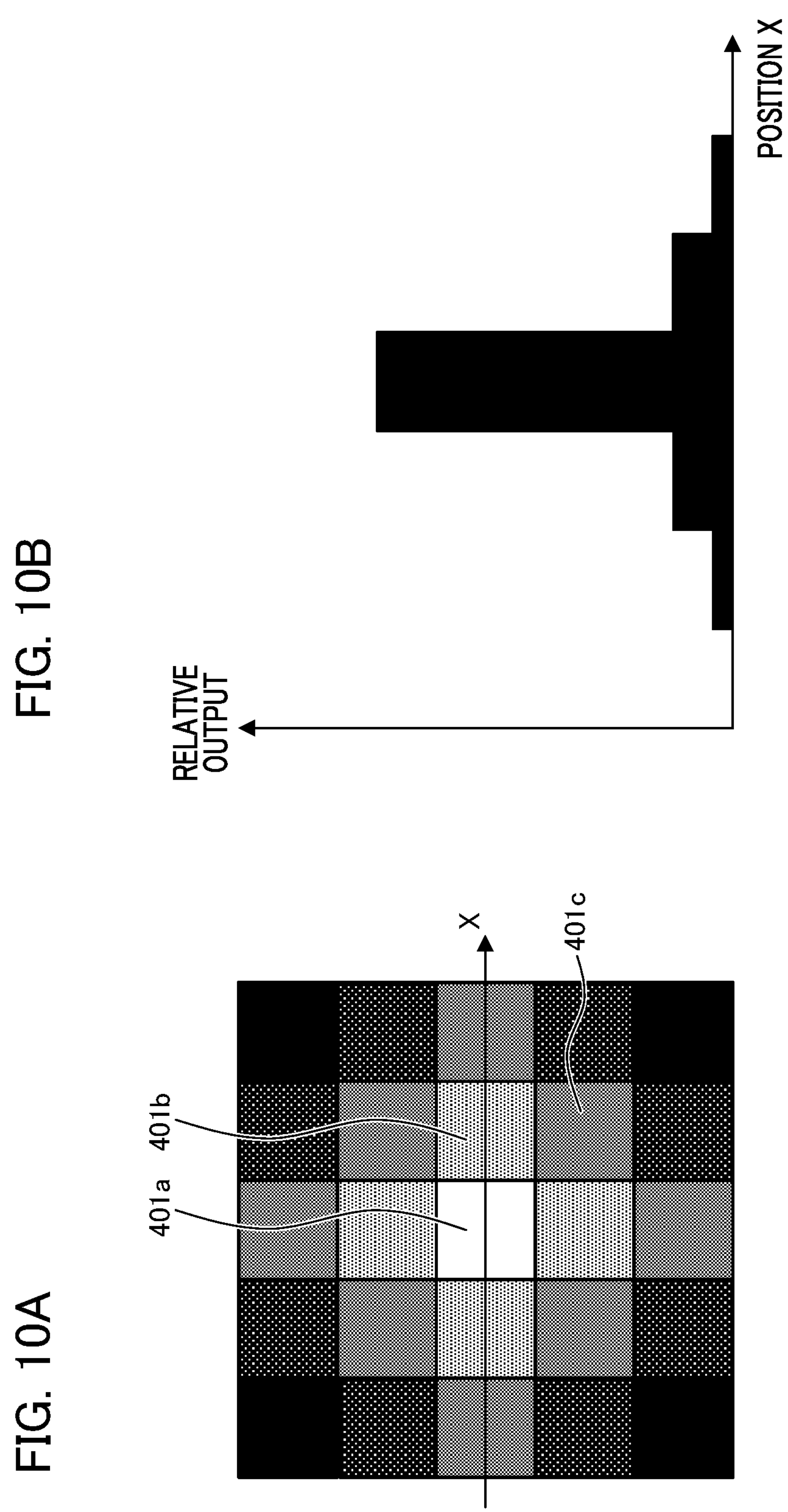
FIGS. 10 A, and B are diagrams explaining interpixel crosstalk according to the First Embodiment.

FIG. 10B is a diagram showing an example of a relative output value in the X axis for FIG. 10 (A). A pixel 401*a* shows a defective pixel (a scratch pixel). A pixel (adjacent pixel) 401*b* and a pixel 401*c* are pixels that have been arranged around the pixel 401*a*. Specifically, the pixel 401*b* is a pixel that is adjacent to the pixel 401*a* and the pixel 401*c*. The pixel 401*c* is a pixel that is adjacent to the pixel 401*b*.

As is shown in FIG. 10A and FIG. 10B, if there is a defective pixel inside of the pixel region, the output level for the pixel 401*b* and the pixel 401*c*, which have been arranged around the pixel 401*a*, will increase regardless of the illuminance for the incident light. This can be thought to be because, as a result of avalanche light emission in the pixel 401*a*, an electric charge is generated in the adjoining pixels as well, and avalanche multiplication also occurs in the adjoining pixels due to this electric charge.

That is, it becomes easy for avalanche light emission to occur due to the defect of the pixel 401*a*, which thereby causes a cluster-type defect, and the relative output from the pixels surrounding the pixel 401*a* becomes high and the image quality is lowered. Cluster-type defects stand out in an image in comparison to single defects, and are connected to considerable degradations in image quality.

Below, an explanation will be given as a comparative mode of a conventional photoelectric conversion apparatus in which the timing of the control signal CLK to the switch 502 is always fixed with reference to FIG. 11, FIG. 12, and FIG. 13. After this, an explanation will be given of the photoelectric conversion apparatus in the First Embodiment, in which control is performed for the timing of the control signal CLK while referring to FIG. 14, FIG. 15, and FIG. 16.

Figure 11A:
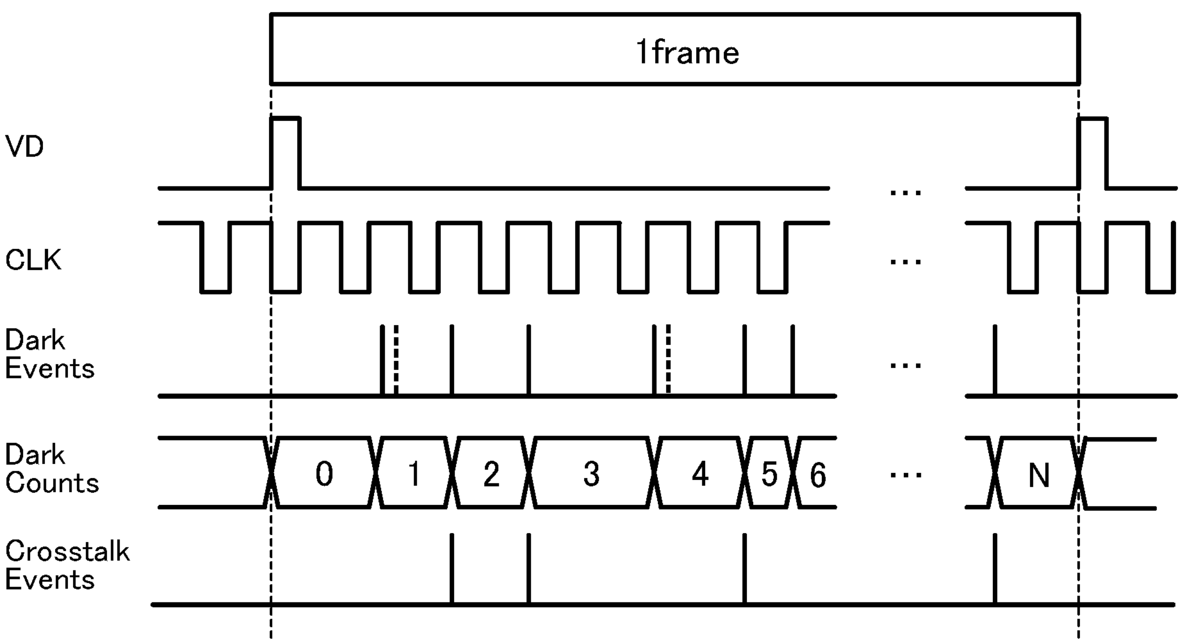
FIGS. 11 A, and B are diagrams of timing charts for a photoelectric conversion element of a conventional photoelectric conversion apparatus in high illuminance conditions and low illuminance conditions.
Figure 11B:
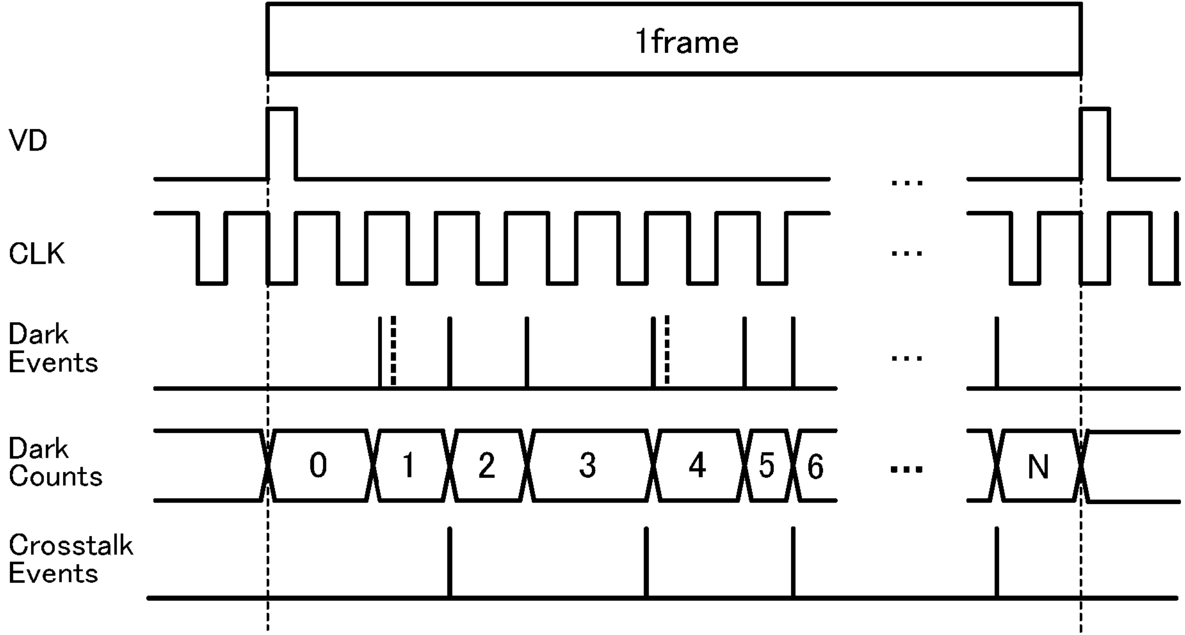

FIGS. 11 A, and B are diagrams showing timing charts for a photoelectric conversion element 400 of a conventional photoelectric conversion apparatus in an image capturing mode under high illuminance conditions and low illuminance conditions. FIG. 11 (A) is a diagram of a timing chart for the control signal, the avalanche light emission in the pixel 401*a*, and the like during the period for one frame at the time of image capturing with high illuminance (in a bright environment) for a conventional photoelectric conversion apparatus.

FIG. 11 (B) is a diagram of a timing chart showing the control signal, avalanche light emission, and the like during the period for one frame at the time of image capturing under low illuminance (in a dark environment) for a conventional photoelectric conversion apparatus.

In a conventional photoelectric conversion apparatus, in both of the cases of image capturing under high illuminance and image capturing under low illuminance, a fixed control signal CLK is supplied to the switch.

A period of one frame indicates, for example, the period from the buildup of a pulse signal VD until the next buildup of the pulse signal VD. Note that in the First Embodiment, the period for one frame is, for example, the period in which the vertical scanning circuit 410 scans from a pixel in the first row that has been arranged in the pixel region until the pixel in the final row.

That is, the period from after the pulse signal VD, which is the vertical synchronization signal, becomes a high level once until the next time it becomes a high level becomes the period for one frame. In this context, during the period for one frame, it is not necessary to scan the pixels for every row from the pixels in the first row to the pixels in the final row.

For example, in a case in which a portion of the rows from among all of the rows are subsampled and scanned, the period during which scanning is performed in one direction from a specific row until scanning for the last row is finished is made the period for one frame. In addition, after a specific row has been subsampled and scanned, in a case in which the row that was subsampled is scanned, the period for one frame may also be made until the scanning of the subsampled row is completed.

In between the periods for each frame, it is preferable that the count value for the counter circuit 511 of the signal processing circuit 403 be reset. The timing for resetting the count value may be performed at the same time for all pixels, or it may also be performed for each pixel row in order.

In the First Embodiment, the exposure period indicates the period in a state in which it is possible for light to become incident on the APD 501, and a state in which the APD 501 and the signal processing circuit 403 can read out a signal. In addition, the non-exposure period indicates the period for a state in which the APD 501 in the pixel region 12 is shielded and no light becomes incident thereon.

In this context, a state in which it is possible for light to become incident on the APD indicates a state in which it is not being shielded by a mechanical or electronic shutter, or the like. In addition, the period for a state in which the APD 501 and the signal processing circuit 403 can read out a signal indicates the period in which the APD 501 and the signal processing circuit 403 are not intentionally off.

Note that in the First Embodiment and each of the following embodiments, the period for the quenching operation in the APD 501 does not correspond to this, and the period for the quenching operation is made the period in which it is possible to read out a signal. Note that the exposure period and the non-exposure period are not limited to the opening and closing of the shutter, and may also be defined by changing whether or not it is possible to acquire a photon signal by adjusting the bias that is applied to the APD 501.

The control signal CLK is a signal that controls the on and off of the switch 502 that was explained in FIG. 8 and FIG. 9

As shown in FIG. 11 (A) and FIG. 11 (B), dark events are diagrams showing the timing of the emission of photons due to avalanche light emission in the pixel 401*a*, which is the defective pixel in FIG. 10. During dark events, the buildup timing is the photon generation timing.

Note that although the solid line and the broken line that are shown in the dark events are both the photon generation timing, the solid line is the photon generation timing that is counted as the signal, and the broken line is the photon generation timing that is not counted as the signal, This is because, as was described above, before the voltage for the node A becomes equal to or greater than the determination threshold, the voltage for the node A decreases, and is not determined to be a signal. Note that in FIG. 11, avalanche light emission that is caused by light from a subject becoming incident on the APD 501 is not shown, and what is shown is only avalanche light emission due to dark events, which is caused by the trap level for the pixel 401*a*, or the like.

Dark counts show the count operations for the counter circuit 511 that is included in the pixel 401*a*. The recharging operations for the APD 501 are performed when the voltage for the control signal CLK is at a low level. Therefore, after a recharging operation has been performed, if the electrical charge in the APD 501 is avalanche multiplied, photons are determined to be signals, and the count number for the counter circuit 511 increases by one.

As shown in in FIG. 11 (A) and FIG. 11 (B), crosstalk events are diagrams showing the timings at which crosstalk occurs in the pixels surrounding the pixel 401*a*. The timing at which crosstalk occurs is random, and therefore, one example of this is shown in FIG. 11 (A) and FIG. 11 (B).

Figures 12A, 12B:
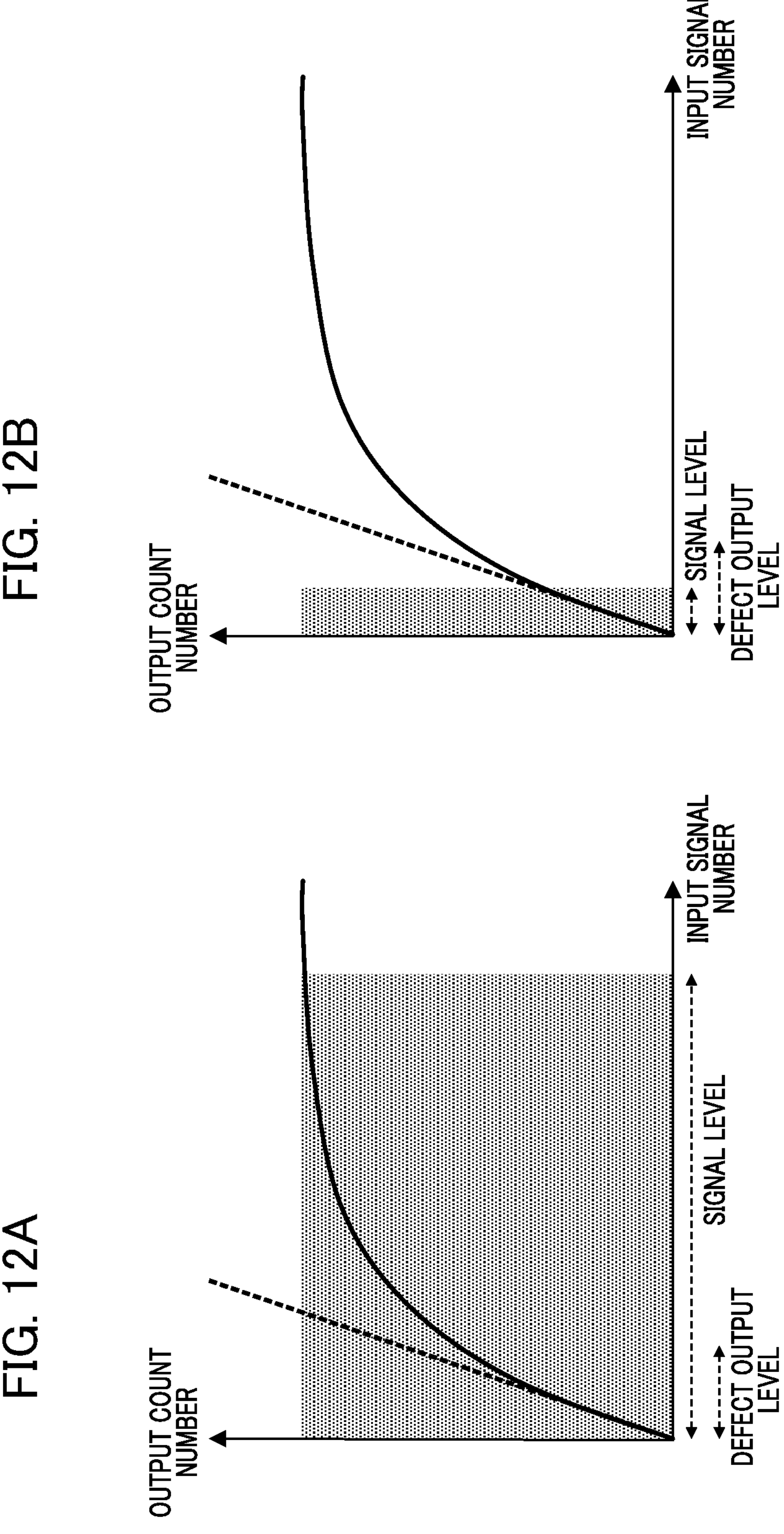
FIGS. 12 A, and B are diagrams of the output count numbers for a photoelectric conversion element of a conventional photoelectric conversion apparatus in high illuminance conditions and low illuminance conditions.

FIGS. 12 A, and B are diagrams of the output count numbers for the photoelectric conversion element 400 of a conventional photoelectric conversion apparatus in an image capturing mode under high illuminance conditions and low illuminance conditions. FIG. 12(A) shows the relationship between the number of incident photons and the output count number per one pixel in an image capturing mode under high illuminance conditions for the conventional photoelectric conversion apparatus that is shown in FIG. 11 (A).

In addition, FIG. 12 (B) shows the relationship between the number of incident photons and the output count number per one pixel in an image capturing mode under low illuminance conditions for the conventional image capturing apparatus that was shown in FIG. 11 (B).

As is shown in FIG. 12(A), at the time of image capturing with a high illuminance, the output level for the defect (a scratch output level) becomes low in relation to the signal level. In contrast, as is shown in FIG. 12 (B), at the time of image capturing with low illuminance, there are cases in which the output level for the defect becomes high in relation to the signal level.

Figures 13A, 13B, 13C, 13D:
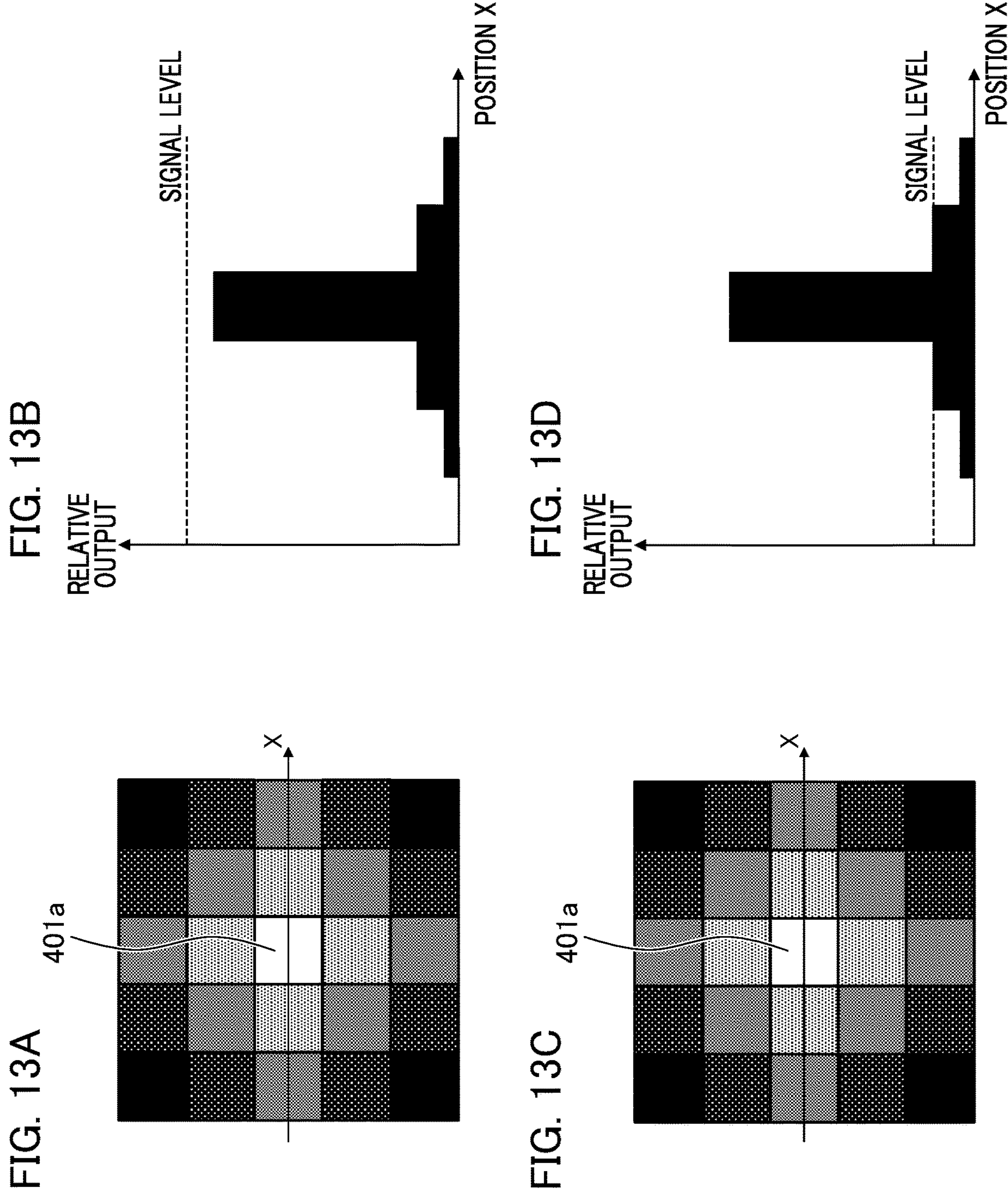
FIG. 13 A to D are diagrams showing the effects of interpixel crosstalk in the photoelectric conversion element of the First Embodiment in high illuminance conditions and low illuminance conditions.

FIG. 13 A to D are diagrams showing the effects of interpixel crosstalk in the photoelectric conversion apparatus 400 in an image capturing mode under high illuminance conditions and low illuminance conditions with respect to the photoelectric conversion apparatus according to the First Embodiment. FIG. 13 (A) is a diagram showing an output distribution for the pixel 401*a*, and 5×5 pixels therearound at the time of image capturing with a high illuminance.

FIG. 13 (B) is a diagram showing one example of a relative output value in the X axis of FIG. 13 (A). FIG. 13 (C) is a diagram showing the output distribution for the pixel 401*a* and 5×5 pixels therearound at the time of image capturing with a low illuminance, and FIG. 13 (D) is a diagram showing one example of a relative output value in the X axis of FIG. 13 (C).

FIG. 13 (B) and FIG. 13 (D) are diagrams showing the signal level at the time of each image capturing. The relative output value for the signal value is higher than the relative output value for the pixel 401*a* at the time of image capturing with a high illuminance, and therefore, it is difficult for abnormal outputs of the pixel 401*a* based on defects or the like to stand out.

In contrast, the relative output value for the signal level is lower than the relative output value for the pixel 401*a* at the time of image capturing with low illuminance, and therefore, abnormal outputs of the pixel 401*a* stand out. Therefore, the signal that occurs as a result of crosstalk at the time of image capturing with a low illuminance make it easy for decreases in image quality to occur.

Figure 14A:
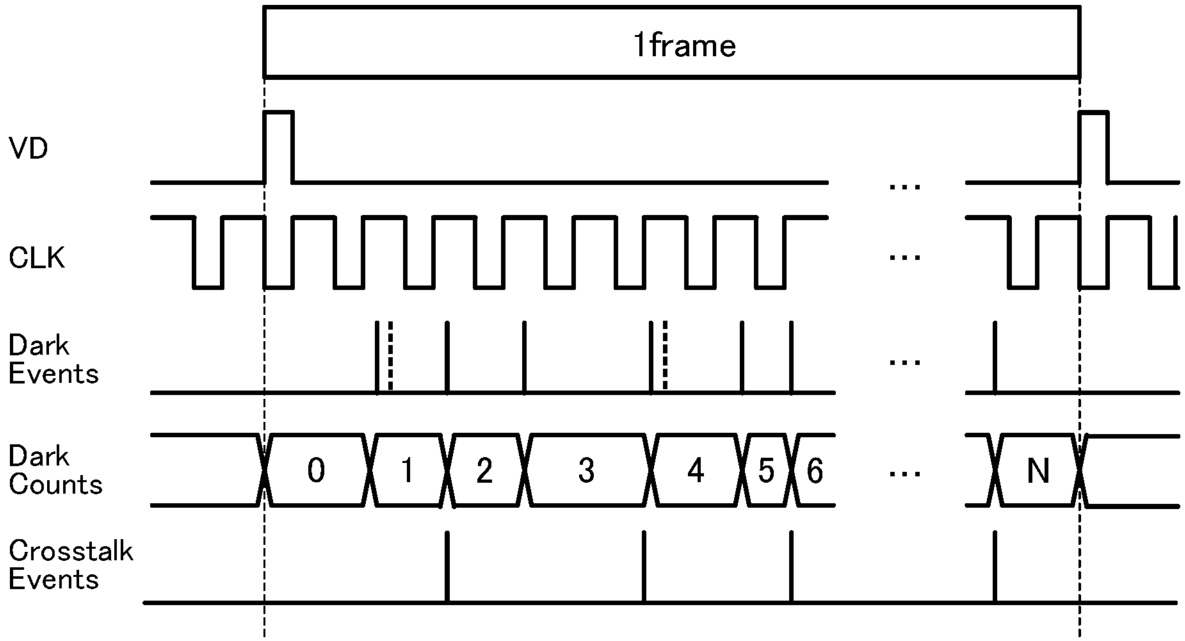
FIGS. 14 A, and B are diagrams of timing charts for the photoelectric conversion element of the First Embodiment in high illuminance conditions and low illuminance conditions.
Figure 14B:
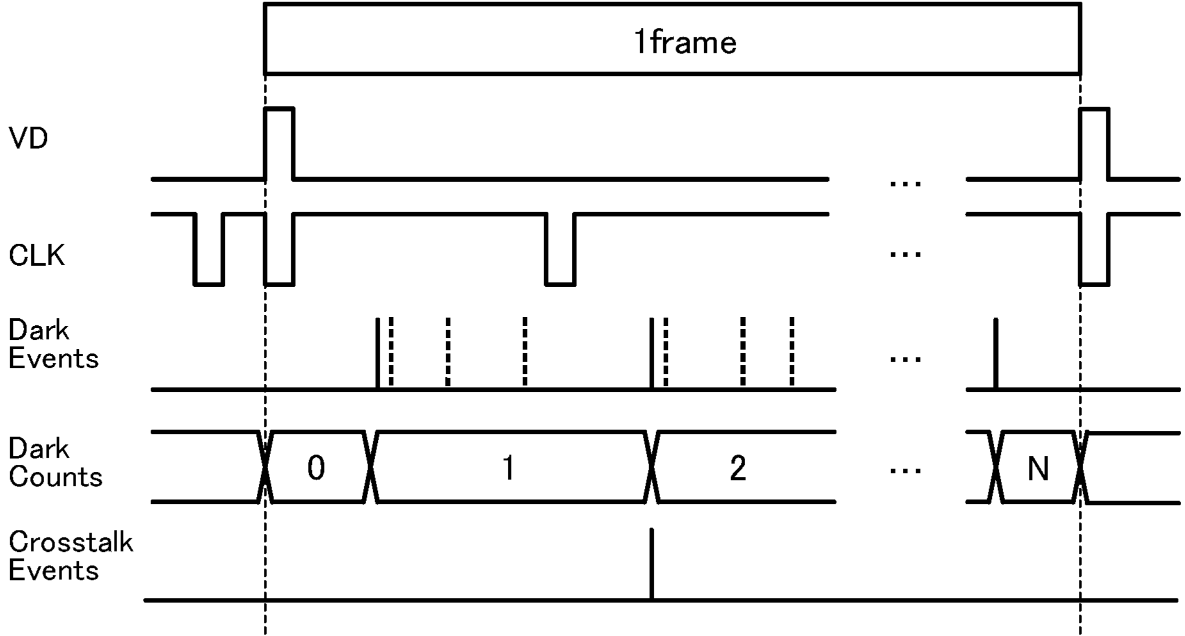

FIGS. 14 A, and B are diagrams of timing charts for the image capturing element 400 in an image capturing mode under high illuminance conditions and low illuminance conditions in the First Embodiment. FIG. 14 (A) is a diagram showing a timing chart for the control signal, the avalanche light emission in the pixel 401*a*, and the like during the period for one frame at the time of image capturing with high illuminance for the photoelectric conversion apparatus of the First Embodiment.

FIG. 14 (B) is a diagram showing a timing chart for the control signal, the avalanche light emission for the pixel 401*a*, or the like during the period for one frame at the time of image capturing with low illuminance for the photoelectric conversion apparatus of the First Embodiment.

As is shown in FIG. 14 (B), at the time of image capturing with low illuminance in the First Embodiment, the pulse signal number for the control signal CLK for the period for one frame is made smaller than the pulse signal number for the control signal CLK for the period for one frame at the time of image capturing with high illuminance.

In this manner, in the First Embodiment, the control unit 104 controls the signal generating unit 515, and makes it such that the number of pulses for the pulse signal that is generated by the signal generating unit 515 during the period in which the signal for one frame is acquired is different at the time of image capturing with high illuminance and at the time of image capturing with low illuminance.

That is, the number of pulses for the pulse signal is changed during the period in which the signal for one frame is acquired according to the illuminance in the signal that has been acquired by the photoelectric conversion element 400. By using such a configuration, it becomes difficult to detect abnormal outputs from the pixel 401*a*, which is the defective pixel, at the time of image capturing with low illuminance, and it is possible to suppress decreases in image quality in comparison to conventional photoelectric conversion apparatuses.

For example, it is preferable that the lower the illuminance of the environment in which the subject or the like exists, the smaller the pulse signal number for the control signal CLK for the period for one frame becomes. This is because in a case in which the pulse signal number (the number of pulses for the pulse signal) is the same as for an environment with a high illuminance, the smaller that the illuminance for the environment in which the subject or the like exists is, the easier it becomes for a decrease in image quality due to crosstalk to occur. The details of the changes to the pulse signal number for the control signal CLK according to the illuminance of this environment will be explained below.

Figures 15A, 15B:
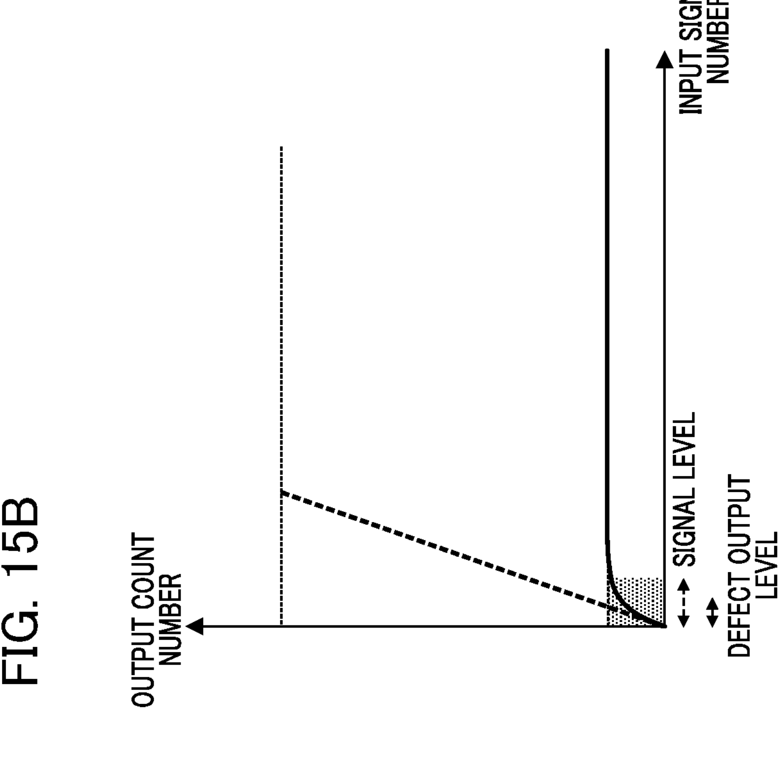
FIGS. 15 A, and B are diagrams of the output count numbers for the photoelectric conversion unit of the First Embodiment in high illuminance conditions and low illuminance conditions.

FIG. 15 A, and B are diagrams for the output count number for the photoelectric conversion element of the First Embodiment in an image capturing mode under high illuminance conditions and under low illuminance conditions. FIG. 15 (A) shows the relationship between the number of incident photons and the output count number per one pixel at the time of image capturing with high illuminance and the time of image capturing with low illuminance in the photoelectric conversion apparatus of the First Embodiment that was shown in FIG. 14 (A).

In addition, FIG. 15 (B) shows the relationship between the number of incident photons and the output count number per one pixel at the time of image capturing with low illuminance for the photoelectric conversion apparatus of the First Embodiment that was shown in FIG. 14 (B).

As is shown in FIG. 15 (B), in the image capturing apparatus 1 that includes the photoelectric conversion apparatus of the First Embodiment, the control unit 104 performs control such that the output level for the defect is made lower than the signal level.

Therefore, the read out of signals caused by crosstalk from the pixel 401*a* can be reduced, and it becomes possible to suppress decreases in image quality at the time of image capturing with low illuminance in comparison to conventional photoelectric conversion apparatuses.

Figures 16A, 16B, 16C, 16D:
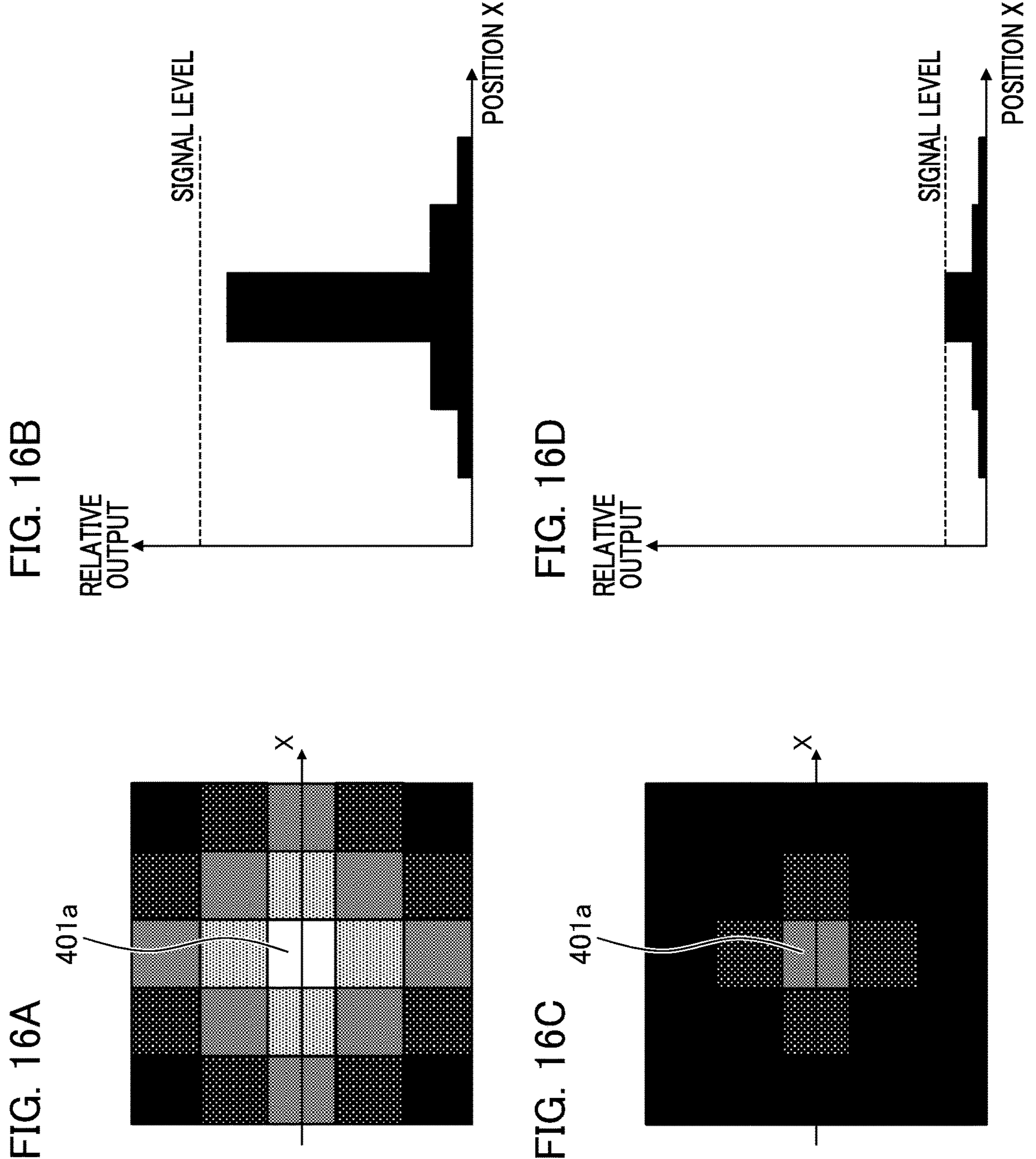
FIG. 16 A to D are diagrams showing the effect of interpixel crosstalk in the photoelectric conversion element of the First Embodiment in high illuminance conditions and low illuminance conditions.

FIG. 16 A to D are diagrams showing the effects of interpixel crosstalk for the photoelectric conversion element 400 of the First Embodiment in an image capturing mode under high illuminance conditions and low illuminance conditions. FIG. 16 (A) is a diagram showing the output distribution for the pixel 401*a* and 5×5 pixels therearound during image capturing with high illuminance.

FIG. 16 (B) is a diagram showing one example of a relative output value in the X axis of FIG. 16 (A). FIG. 16 (C) is a diagram showing an output distribution for the pixel 401*a* and 5×5 pixels therearound at the time of image capturing with low illuminance. FIG. 16 (D) is a diagram showing one example of a relative output value in the X axis for FIG. 16 (C).

FIG. 16 (B) and FIG. 16 (D) show the signal levels at the time of each image capturing. As is shown in FIG. 16 (C), and FIG. 16 (D), according to the image capturing apparatus 1 that includes the photoelectric conversion apparatus of the First Embodiment, it is possible to make the relative output value for the pixel 401*a*, which is the defective pixel, lower than that of a conventional photoelectric conversion apparatus at the time of image capturing with low illuminance.

Therefore, the occurrence of cluster-type defects that occur due to crosstalk can be reduced at the time of image capturing with a low illuminance, and decreases in the image quality at the time of image capturing with a low illuminance can be suppressed.

Below, in the First Embodiment, the threshold for detecting a defective pixel will be changed, and defective pixel data corresponding to the pulse signal number for the control signal CLK will be generated according to the pulse signal number for the control signal CLK for the period for one frame (the exposure period during which the signal for one frame is acquired). In addition, an example will be explained below of a method for correcting a signal that has been acquired by the image capturing element 102 based on the information for this defective pixel data that has been created.

Figures 17A, 17B:
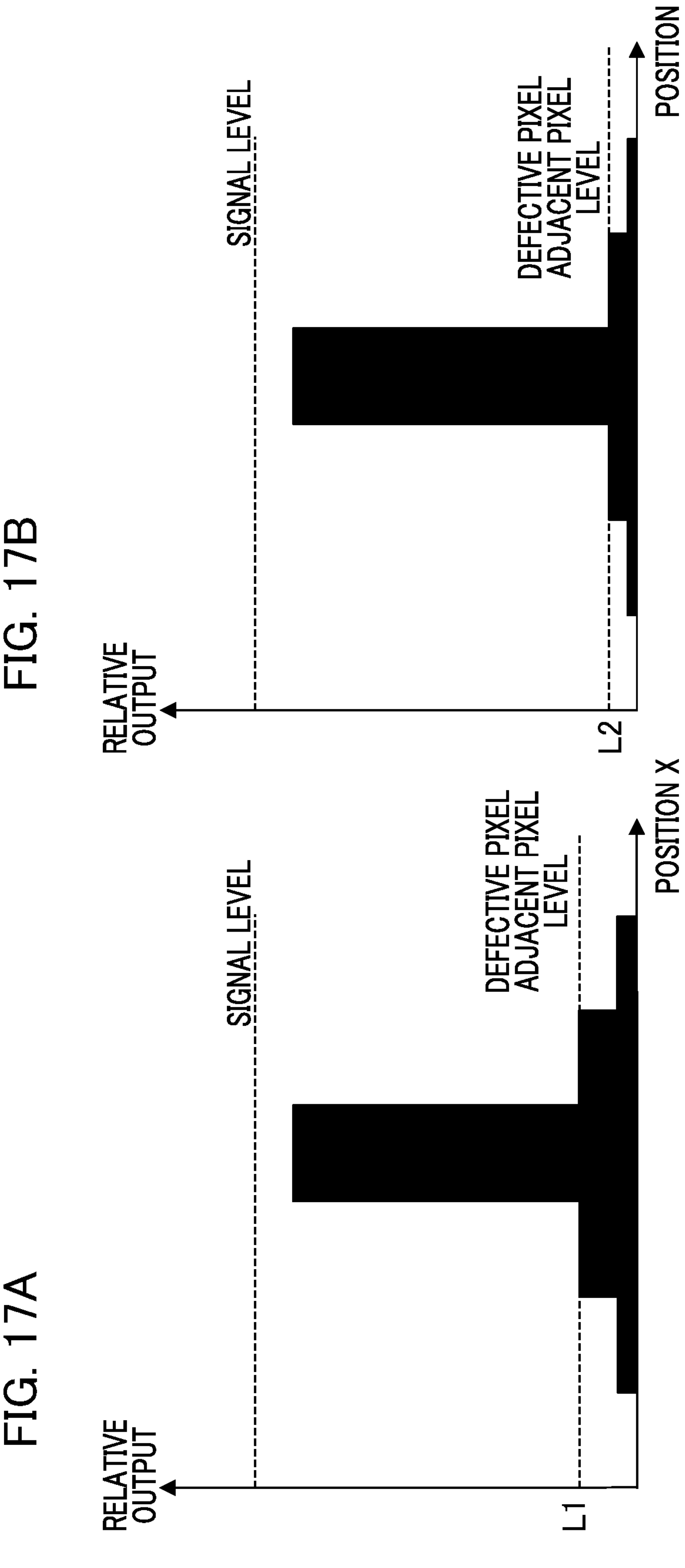
FIGS. 17 A, and B are diagrams showing the relationship between the number of pulse signals for the control signal CLK and the pixel level for the cluster-type defects in the First Embodiment.

Below, the relationship between the pulse signal number for the control signal CLK and the pixel level for the cluster-type defect will be explained using FIG. 17 and FIG. 18. FIGS. 17 A, and B are diagrams explaining the relationship between the pulse signal number for the control signal CLK and the pixel level for the cluster-type defect in the First Embodiment.

FIG. 17 (A) is a diagram showing one example of a pixel level for a cluster defect with the pulse signal number N1. FIG. 17 (B) shows the pixel level for a cluster defect with a pulse signal number of N2. However, it is made a condition that the pulse signal number N1 is larger than the pulse signal number N2.

In addition, a case is imaged in which again has been applied such that the average value for pixel outputs for an image for the pulse signal number N1 and the pulse signal number N2 are equal. Therefore, the pixel level for the pixel 401*a*, which is arranged in the center of the center portion of the cluster defect, is the same for the pulse signal number N1 and the pulse signal number N2.

Figure 18:
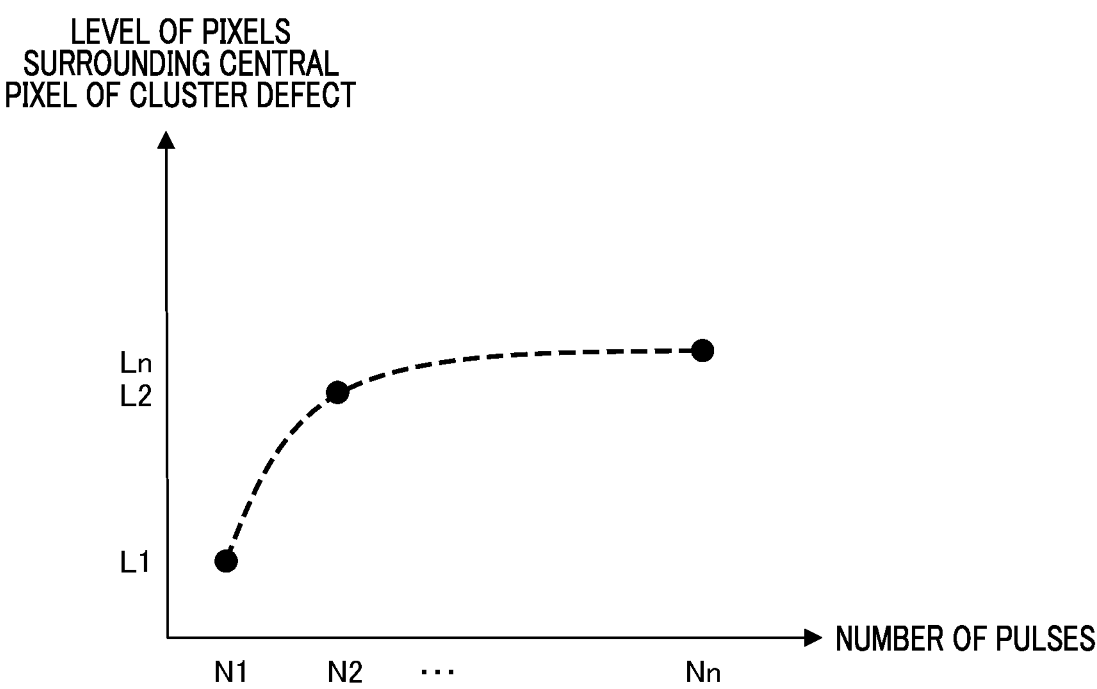
FIG. 18 is a diagram showing the relationship between the number of pulse signals for the CLK and the level of a pixel that is adjacent to the central pixel of the cluster-state defect.

FIG. 18 is a diagram showing a relationship between the pulse signal number for the control signal CLK and the level for pixel 401*b* that is adjacent to the pixel 401*a*, which is the central pixel of the cluster-type defect. The relationship with the level for the pixel 401*b* that is adjacent to the pixel 401*a*, which is the central pixel of the cluster-type defect, is the level for the adjacent pixel 401*b* of the cluster-type defect divided by the ratio for the pixel 401*a*.

As is shown in FIG. 17 (A) and FIG. 17 (B), if the levels for the adjacent pixel 401*b* of the cluster-type defect for the pulse signal number N1 and the pulse signal number N2 are made L1 and L2 respectively, L2 will be smaller in comparison to L.

This shows that the level for the adjacent pixel 401*b* of the cluster-type defect becomes smaller the smaller that the pulse signal number is. In addition, the cluster-type defect is detected at the same time that the pulse signal number is set, and therefore, it is necessary to change the threshold.

In addition, as is shown in FIG. 18, if the pulse signal number is decreased, the level for the pixel 401*b* that is adjacent to the pixel 401*a*, which is the central pixel in the cluster defect, gradually becomes smaller, and when the pulse signal number is small, the rate of the decrease is particularly large.

In contrast, in a case in which only the gain has been made large without changing the pulse signal number for the control signal CLK, the value for the defective pixel becomes larger in line with the gain, and in this case in the First Embodiment, the threshold for the detection of the defective pixel will become larger.

FIG. 19 A, and B are diagrams showing one example of data for a defective pixel in the First Embodiment. FIG. 19 (A) is a diagram of an image of a defective pixel in a captured image. FIG. 19 (B) is a diagram showing an example of defective pixel data that is shown in FIG. 19 (A).

FIG. 19 (A) is an image of a deficient pixel in a captured image. However, the pixel that is surrounded by a black line in the diagram is an example of a deficient pixel. In addition, (X1, Y1), (X2, Y2), (X3, Y3), (X4, Y4), (X5, Y5), (X6, Y6), (X7, Y7), and (X8, Y8) in the diagram show each of the addresses in this defective pixel.

The defective pixel data is configured by the four elements of the defect amount, which is the level for the defective pixel, the addresses within the image of the defective pixel, the type of defective pixel, and the control settings. The defective amount may be a level for a pixel, or it may also be a median value or average value for the surrounding pixels, or it may also be a level difference for the considered pixel.

The addresses within the image for the defective pixel are coordinate information showing the position of the defective pixel in the image (position information), and this may use a two-dimensional address of a horizontal address and a vertical address, or this may also use a one-dimensional address, which is the relative value for the pixel number counted from the top left of the image.

The defective pixel type is the type of defective pixel, and stores the information for what kind of characteristics the defect has. For example, if this is a cluster type deficiency that will spread to the surrounding pixels, or if this is a deficiency that exists by itself.

In the First Embodiment, the cluster deficiency that is the target of the correction can be confirmed in a condition in which light is not becoming incident on the APD and therefore, it is preferable if the pixel level is acquired in a state in which this is shielded by a mechanical or electronic shutter, or the like. However, the pixel level may also be acquired using a light source that has a uniform illuminance. The control settings show the exposure conditions, the pulse signal number for the control signal CLK, the size of the gain, and the like, and are set in the control unit 104.

FIG. 19 (B) is a diagram showing one example of defective pixel data with respect to the defective pixel that is shown within the image shown in FIG. 19 (A). FIG. 19 (B) discloses data for control settings such as the defect amount, the addresses, the defect type, the number of pulses, and the like.

For example, the defect amount for the address (X1, Y1), which is the position information (coordinate information) for the pixel), is Z1, the type of defect is a cluster-type defect K1, and the control settings M1 (not illustrated in FIG. 19) such as the pulse signal number N1 for the control signal CLK in this case, the size of the gain, and the like, are stored.

However, the type of defect is not limited to that described above. For example, there are cases in which although a defect is a cluster-type defect, the defect amount for the adjacent pixels is small, and this cannot be precisely detected by the defective pixel detecting unit 108. In this case, this is detected as a single defect, and processing is executed by the defective pixel correcting unit 109 with this as a single defect.

In addition, the defect pixel data is stored in a predetermined format on the RAM 105, and the ROM 106. That is, the RAM 105 and the ROM 106 function as storage units that store position information for a pixel that will be the correction target that has been acquired in advance (the defective pixel).

Note that the defective pixel data may also be updated for each detection, and it may also be added. In addition, this may also be added to in a case in which this is a sensor and the defective pixel is known in advance.

Below, an explanation will be given using FIG. 20 of the flow for the detection of a defective pixel, which is a pixel that will become a correction target, in the defective pixel detecting unit 108 according to the pulse signal number for the control signal CLK and the gain, which have been set by the control unit 104.

Figure 20:
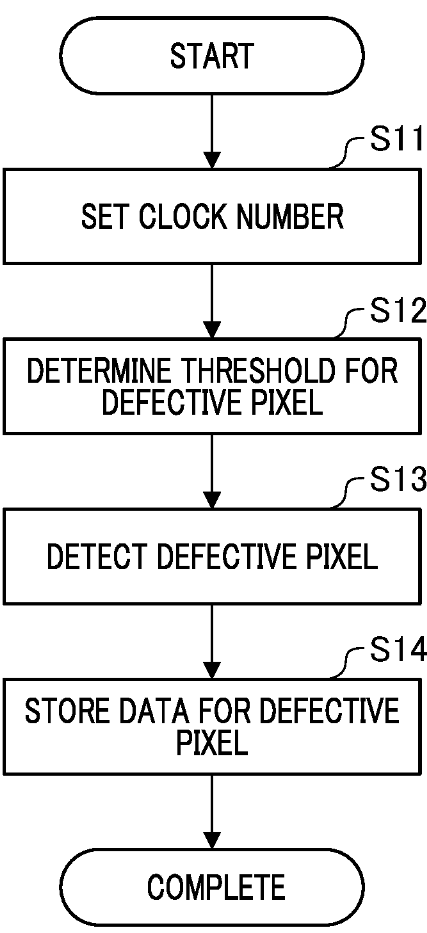
FIG. 20 is a diagram showing the flow for the detection of a defective pixel according to the number of pulse signals for the control signal CLK.

FIG. 20 is a flowchart showing the flow for the detection of the defective pixel according to the pulse signal number for the control signal CLK in the First Embodiment. Note that below, it is assumed that before the beginning of the present processing, the photoelectric conversion apparatus already has a table with the defective pixel threshold data, which is information for the plurality of control settings and the threshold, and the like that were shown in FIG. 3

As was explained above, it is possible to make the output level for the defective pixel lower than the signal level at the time of image capturing with low illuminance by decreasing the pulse signal number for the control signal CLK for the period of one frame. In addition, because image capturing is being performed with a low illuminance, the output from the image capturing element 102 naturally becomes smaller. Note that in a case in which this is used as an image capturing apparatus, and in the case of image capturing with a high illuminance and the case of image capturing with a low illuminance as well, it is preferable if an average value for the output to a monitor or the like is always fixed.

Therefore, it is preferable that at the time of image capturing with a low illuminance, gain is applied in the signal processing unit 103, and that the average value for the output to the monitor or the like is kept constant. In the First Embodiment, when gain is applied at the time of image capturing with a low illuminance, the pulse signal number for the control signal CLK is also changed at the same time or in joint operation with the gain application processing. Note that the signal processing unit 103 changes the value for the gain to be applied according to the illuminance of the subject.

For example, in a case in which the subject illuminance has been quartered (it has gone from a high illuminance to a low illuminance), in order to maintain the brightness, the signal processing unit 103 applies a fourfold gain. In addition, the pulse signal number for the control signal CLK for the period for one frame is quartered at the same time as this or in joint operation therewith.

That is, the control unit 104 controls the signal generating unit 515, and quarters the number of pulses for the period of one frame that is generated by the signal generating unit 515. For example, at the time of image capturing with a high illuminance, in a case in which the pulse signal number for the control signal CLK for the period for one frame was 2048, the control unit 104 performs control such that the pulse signal number for the control signal CLK is lowered to 512 during the period for one frame.

In this manner, in the First Embodiment, when the signal processing unit 103 has applied a gain according to the illuminance based on at least the signal acquired by the photoelectric conversion element 400, the signal generating unit 515 changes the pulse signal number that is generated during the period for one frame at the same time as this or in joint operation therewith. That is, in a case in which the time of image capturing at a high illuminance has become the time of image capturing at a low illuminance, the pulse signal number that is generated during the period for one frame is changed so as to become a smaller number than that at the time of image capturing with a high illuminance.

The image capturing apparatus 1 of the First Embodiment is configured so as to have a mode according to the pulse signal number that was described above. That is, it has a first mode, which is a mode in which the pulse signal number that is generated during the period for one frame is not changed at the time of image capturing with a high illuminance, and a second mode, which is a mode in which the pulse signal number generated during the period for one frame is changed so as to be lower than the pulse signal number for the first mode at the time of image capturing with a low illuminance.

Control is performed by the control unit 104 so as to switch between the first mode and the second mode as was described above according to the illuminance based on at least the signal that has been acquired by the photoelectric conversion element 400. In addition, in a case in which a gain has been applied as was described above as well, it is possible to switch the mode in order to change the pulse signal number that is generated during the period for one frame.

Note that when the mode is being switched between the first mode and the second mode, the signal generating unit 515 functions as a switching unit. Note that the control unit 104 controls the signal generating unit 515, and therefore the control unit 104 may also function as a switching unit.

Note that when the control unit 104 changes the pulse signal number for the period for one frame, the pulse signal number may also be selected from among the pulse signal numbers that can be set according to the illuminance based on at least a signal that has been acquired by the photoelectric conversion element 400.

In addition, the control unit 104 performs control such that the pulse signal number is changed so as to become the pulse signal number that has been selected. In addition, as was described above, in the First Embodiment, the threshold in the detection for the defective pixel is changed according to the pulse signal number for the control signal CLK for the period of one frame.

That is, the threshold selecting unit 203 selects a threshold according to the pulse signal number for the control signal CLK for the period for one frame from a table having defective pixel threshold data such as that shown in FIG. 3, and sets the threshold value.

In the First Embodiment, when the pulse signal number for the control signal CLK has been decreased, it is preferable that the gain is automatically increased at the same time or in joint operation therewith. However, it may also be made such that the gain is manually set and raised.

Note that as has been described above, in a case in which just the gain is increased without changing the pulse signal number for the control signal CLK, the value for the defective pixel will increase along with the gain, and therefore, it is necessary to increase the threshold for the detection of the defective pixel.

Therefore, in a case in which the pulse signal number for the control signal CLK for the period for one frame does not change, that is, when gain is applied in the same mode, the threshold for the detection of the defective pixel is increased. For example, the threshold selecting unit 203 selects a threshold with a value that is larger than that in the current mode from defective pixel threshold data at the same time as or in joint operation with the timing at which gain is applied in the same mode, and sets the threshold.

Below, with reference to FIG. 20, the flow for the detection of the defective pixel in the defective pixel detecting unit 108 will be explained. Each processing that is shown below is realized by the control unit 104 of the image capturing apparatus 1 executing the programs that have been stored on the ROM 106 and the RAM 105. In addition, the notation of each process (step) has been simplified by expressing each process (step) by adding an S to the beginning thereof.

First, during S11, the control unit 104 sets the pulse signal number for the control signal CLK for the period of one frame. For example, this is set to the pulse signal number N1 for the control signal CLK, which is a pulse signal number that can be set. At this time, the gain is changed by the control unit 104 to match the pulse signal number for the control signal CLK. Note that the gain does not need to be applied at this time.

Next, during S12, the threshold selecting unit 203 of the defective pixel detecting unit 108 selects a threshold for when detecting the defective pixel in relation to the setting for the pulse signal number for the control signal CLK that was set during S11. Note that when selecting the threshold, the threshold is selected according to the pulse signal number N1 for the control signal CLK from among a plurality of thresholds that are defective pixel threshold data.

Note that the plurality of thresholds that are in the defective pixel threshold data are different from the value for the threshold according to the pulse signal for the control signal CLK. Specifically, the smaller the pulse signal for the control signal CLK that is generated during the period for one frame is, the smaller a value the threshold is set as.

In this manner, the threshold for the signal processing unit 103 to determine whether or not to perform correction for a signal is different for the first mode, and the second mode, in which the number of pulses for the pulse signal during the exposure time in which the signal for one frame is acquired is smaller than in the first mode.

The relationship for making the threshold smaller according to this decrease in the pulse signal for the control signal CLK is as shown in FIG. 18. In contrast, when the pulse signal number for the control signal CLK for the period for one frame has been reduced, it is determined that if the level for the defective pixel decreases and the threshold is lowered, correction is not necessary. That is, it is determined that this is not a defective pixel, and the pixel will not be corrected.

Next, during S13, the defective pixel detecting unit 108 performs detection for a defective pixel based on the threshold that was selected during S12. When performing the detection for a defective pixel, image capturing is performed under specific conditions, and the defect amount is calculated from the difference between the pixel level that is predicted from the conditions and the output from the image capturing element 102.

More specifically, in a case in which a video image signal has been acquired under conditions in which no light enters the image capturing apparatus 1, it can be thought that the output for the pixel level from the image capturing element 102 will become zero. In contrast, the pixel level for the defective pixel will increase. This pixel level and the threshold that was selected during S12 are compared, and the defective pixel is detected.

Next, during S14, the defective pixel detecting unit 108 stores the control settings such as the defect amount, defect position, and defect type for the defective pixel that was detected during S13, the settings for the pulse signal for the control signal CLK and the gain settings for this time, and the like to serve as the pixel defect data on the RAM 105 and the ROM 106.

It is preferable that the flow that was explained in the above FIG. 20 is performed at all number of pulses that can be set for the control signal CLK and the defective pixel is detected. However, a method that will be described below in which detection of the defective pixel at a plurality of pulse numbers is performed, and the values for the defective pixel data at the other number of pulses are predicted from the result thereof is also acceptable.

The generation of defect data may be performed every time that the image capturing apparatus is started up, or it may also be performed just once when manufacturing processing adjustments are made to the image capturing apparatus 1. Conversely, this may also be executed during image capturing using a user operation. In a case in which this is performed at the time of adjustment, it is possible for the defective pixel correcting unit 109 to use the defect information that has been generated by storing the data that was generated in the RAM 105 on the ROM 106, and thereafter by just opening the data from the ROM 106 on the RAM 105 every subsequent time that the image capturing apparatus is started up.

Figure 21:
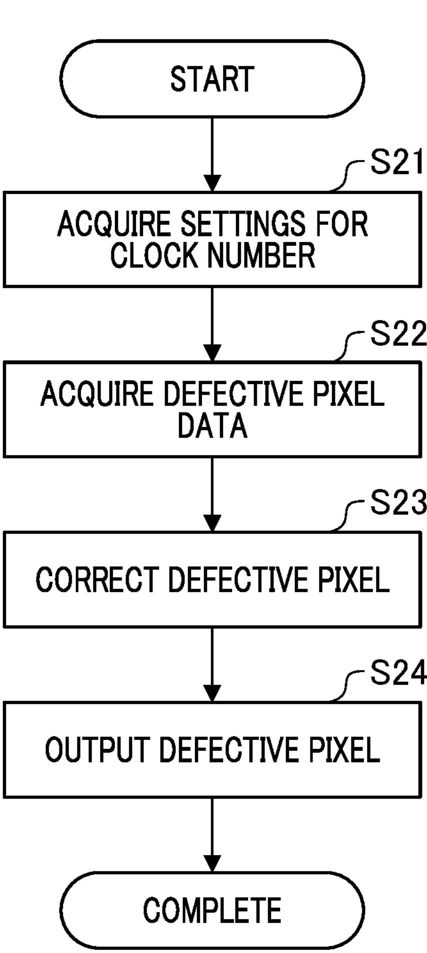
FIG. 21 is a diagram showing the flow for the correction of the defective pixel according to the number of pulse signals for the control signal CLK in the First Embodiment.

Below, the flow for correcting the defective pixel according to the pulse signal number for the control signal CLK during the period for one frame will be explained with reference to FIG. 21. FIG. 21 is a diagram showing the flow for correcting a defective pixel according to the pulse signal number for the control signal CLK in the First Embodiment. At the time of the processing in FIG. 21, correction processing is executed on a signal that was acquired by the photoelectric conversion element 400 based on the pixel position information that becomes the correction target using the defective pixel correcting unit 109 that was explained in FIG. 4.

First, upon beginning image capturing in the image capturing apparatus 1, during S21, the control unit 104 acquires the information for the pulse settings for the control signal CLK during the period for one frame. As was explained above, the pulse signal number for the control signal CLK for the period for one frame in the First Embodiment is decided based on each drive mode (the first mode, and the second mode).

The pulse signal number for the control signal CLK for the period for one frame may also be set manually based on a command from an external unit that is received by an external unit I/F or the like. In addition, it may also be made such that this is set automatically by the control unit 104 based on information that has been analyzed by the signal processing unit 103 based on the output of the image capturing element 102. In the following explanation, it is assumed that, for example, the pulse signal number (clock number) for the control signal CLK for the period for one frame is N1.

Next, during S22, the defect information selecting unit 302 of the defective pixel correcting unit 109 selects the defective pixel data for the clock number N1 that was set from the data for defective pixels that was detected and held during S14, and inputs this into the correcting unit 301.

Next, during S23, the correcting unit 301 for the defective pixel correcting unit 109 executes correction for the defective pixel that has been input. That is, the defective pixel correcting unit 109 performs corrections on the signal that was acquired by the photoelectric conversion element 400 based on the position information for the defective pixel.

When correcting is being performed for the defective pixel that was input by the defect information selecting unit 302, the position for the defective pixel that will be made the correction target is specified based on the address that was input by the address calculating unit 202, and the address data that is included in the defective pixel data as was described above, and this pixel is extracted.

The correcting unit 301 performs correction on the pixel that was extracted as the correction target using pixels that are arranged around the pixel that is the correction target. For example, it can be thought that the median for a level of 5×5 pixels in the vicinity of the pixel that is made the correction target is calculated, and the target pixel is replaced using this result. The range in which the median is performed is not limited thereto, and in addition, this does not need to be a median, and may also be an average value or the like.

Next, during S24, the video image signal generating unit 110 generates the pixel signal that was corrected during S23, that is, it generates a video image signal in a predetermined format based on a pixel signal for the unit of a frame, and outputs this to each block. Note that optional image processing may also be performed on the video image signal at this time.

Above, according to the image capturing apparatus of the First Embodiment, it is possible to decrease the occurrence of cluster-type defects that occur due to cross talk at the time of image capturing with a low illuminance, and it is possible to suppress decreases in image quality.

Second Embodiment

In the Second Embodiment, correction of the defective pixel is performed in a mode for all pulse signal numbers from the defective pixel data that was acquired in a mode for a specific pulse signal number.

The method of the Second Embodiment will be explained below. Note that the configuration and each functional unit of the image capturing apparatus 1 that includes the photoelectric conversion apparatus of the Second Embodiment are the same as those in the First Embodiment, and therefore explanations thereof will be appropriately omitted below.

As was explained in the First Embodiment, during image capturing with a high illuminance, the amount of incident light is larger, and the signal level is also large, and therefore, cluster-type defects are small in relation to the level of the signal, and therefore do not stand out. In contrast, during image capturing with a low illuminance (dark illuminance image capturing), the amount of incident light is small, and therefore, cluster-type defects become large in relation to the signal level, and it becomes easy for these to stand out.

Therefore, control is performed so as to decrease the level of cluster-type defects, and to make it such that cluster type defects do not stand out, by decreasing the pulse signal number for the control signal CLK for the period for one frame. Note that at this time, control is also performed to switch from the first mode to the second mode.

In a case in which image capturing has been performed with a low illuminance, the signal level is low, and therefore, in order to match the output level with that of an image that was captured with a high illuminance, it is preferable that gain is applied. However, if gain is applied, the level for single defect pixels will increase at the same time, and it will become easier for defects to stand out.

In contrast, in cluster-type defects, the pulse signal number for the control signal CLK for the period for one frame is small. Therefore, as was shown in FIG. 17, and FIG. 18, the pixel level for the pixel 401*a*, which is the central pixel in a cluster defect, increases along with the gain. However, the level for the adjacent pixel 401*b*, which is an adjacent defective pixel, becomes low.

That is, if the settings are changed to those in which the pulse signal number for the control signal CLK is small in a low illuminance environment (at the time of image capturing with a low illuminance) from settings in which the pulse signal number for the control signal CLK for the period for one frame is large in a high illuminance environment (at the time of image capturing with a high illuminance), the signal level for the defect will change.

That is, if the first mode is changed to the second mode, in which the pulse signal number for the control signal CLK for the period for one frame is smaller than that in the first mode, the signal level for single defects and in the center of cluster-type defects will become high, and the signal level for the adjacent portions of cluster-type defects will decrease. It becomes necessary to detect a pixel to be made the correction target, and correct this pixel in response to such changes in the signal level of defects.

In the Second Embodiment, detection of the defective pixel is performed using a plurality of pulse signal numbers for the control signal CLK in order to correct the changing level of a defect. For example, defective pixel detection is performed at N1, which is the lowest pulse signal number from among the pulse signal numbers for the control signal CLK for the period for one frame, and at Nn, which is the largest pulse signal number for the control signal CLK for the period for one frame, and the generation of defective pixel data is performed.

With respect to the detection method, the method that was shown in the First Embodiment will be used. In the Second Embodiment, in the case in which the pulse signal number is N1 the first mode is used, and in the case in which the pulse signal number is Nm the second mode is used.

FIGS. 22 A, and B are diagrams showing examples of defective pixel data, which is the detection results for the defective pixel. In the Second Embodiment, as is shown in FIG. 22 (A), and FIG. 22 (B), is becomes such that there are two sets of defective pixel data.

FIG. 22 (A) is defective pixel data for the pulse signal number N1. FIG. 22 (B) is defective pixel data for the pulse signal number Nn. Note that the tables for the defective pixel data that are shown in FIG. 22 (A) and FIG. 2(B) are organized in the order of the largest defect amount from the top of the tables.

In the case of the pulse signal number N1, with respect to the pixel that will become the correction target, a pixel that surpasses the threshold TH1 in the defective pixel data for FIG. 22 (A) is made the defective pixel and becomes the correction target. In the same manner, in the case of the pulse signal Nn, a pixel that surpasses the threshold TH1 in the defective pixel data in FIG. 22 (B) is made the defective pixel and becomes the correction target.

With respect to the pixel that is the correction target in the drive mode for the pulse signal number Nm (m is an arbitrary natural number from 1 to n), which is between the pulse signal numbers N1 to Nn, this is decided from the two tables of the table in the pulse signal number N1 and the table in the pulse signal number Nn.

In the Second Embodiment, the mode in the pulse signal number Nm, which is a signal number that is different from the pulse signal number N1 and the pulse signal number Nm, is made a third mode. In this manner, in the Second Embodiment, there are three drive modes with different pulse signal numbers for the control signal CLK for the period for one frame.

Note that it is possible to switch between these modes using the signal generating unit 515 in the same manner as in the First Embodiment. At the time of this switching processing, the signal generating unit 515 functions as a switching unit. Note that the control unit 104 may also function as the switching unit.

In a case in which the pulse signal number Nm is close to the pulse signal number N1, the defective pixel data during the pulse signal number N1 is used, and the correcting target during the pulse signal number Nm is made a defective pixel, which is pixel for which the pixel level is at or above the threshold TH. In addition, in a case in which the pulse signal number Nm is close to the pulse signal number Nn, the defective pixel data during the pulse signal number Nn is used, and a pixel for which the pixel level is at or above the threshold TH2 is made the defective pixel.

In addition, a threshold TH1_m, and a threshold THn_m are decided according to the difference in pulse signal numbers for the pulse signal number N1, the pulse signal number Nn, and the pulse signal number Nm. For example, this is set such that the threshold TH1_m for the defective pixel data during the pulse signal number N1 is gradually made larger in proportion to the difference between the pulse signal number N1 and the pulse signal number Nm becoming larger.

In addition, for example, settings are made such that the threshold THn_m for the defective pixel data in the pulse signal number Nn becomes gradually larger in proportion to the difference between the pulse signal number Nn and the pulse signal number Nm becoming larger.

In addition, the defective pixel data in the pulse signal number N1 and the pulse signal number Nn is used, and a pixel that was equal to or greater than the threshold TH1_m and the threshold THn_m is made the defective pixel and becomes the correction target. For example, if the threshold TH1 during the pulse signal number N1 is between Z5 and Z6, Z1 to Z5 become the pixels that exceed the threshold, and the pixels for (X1, Y1), (X2, Y2), (X3, Y3), (X4, Y4), and (X5, Y5) become the correction targets.

Detection is also performed for a defect with a defect amount that is equal to or greater than the threshold THn in the same manner in the pulse signal number Nn. If the threshold THn is between W5 and W6, W1 to W5 become the pixels that exceed the threshold, and the pixels for (X9, Y9), (X10, Y10), (X11, Y11), (X12, Y12), and (X13, Y13) become the correction targets.

In the pulse signal number Nm, if the threshold TH1_m for the correction target is between Z2 and Z3, and THn_m is between W2 and W3, the pixels for (X1, Y1), (X2, Y2), (X9, Y9), and (X10, Y10), which correspond to the defect amounts Z1, Z2, W1 and W2, become the correction targets.

At the time of the correction of the defective pixel, correction is executed using the median or the like of the level for the surrounding pixels in the same manner as in the First Embodiment, based on the defective pixel data at the pulse signal number Nm for the control signal CLK for the period of one frame that is set in the control unit 104.

In the image capturing apparatus 1 of the Second Embodiment, the modes that are configured so as to be switchable based on the pulse signal numbers for the control signal CLK that are executed during the detection of the defective image data are not limited to the above explanation, and the modes may also be further increased.

It is possible to increase the precision of the detection as the number of modes increases. Above, in the image capturing apparatus 1 of the Second Embodiment, in addition to the same effects as that in the First Embodiment, it is possible to prevent image distortion due to insufficient corrections or excessive corrections.

Third Embodiment

In the Third Embodiment, a method will be explained in which cluster-type defects are detected and corrected.

Note that the configuration and each functional unit of the image capturing apparatus 1 that includes the photoelectric conversion apparatus of the Third Embodiment are the same as those of the First Embodiment, excluding a defective pixel calculating unit 601, and therefore, below, the points that differ from those in the First Embodiment will be explained, and explanations of the points that are the same as those in the First Embodiment will be omitted.

As was shown in FIG. 17, and FIG. 18, the level for the adjacent pixel 401*b* of the cluster-type defect becomes smaller the smaller that the pulse signal number for the control signal CLK for the period of one frame is. Therefore, when the pulse signal number for the control signal CLK has been changed, the level of the adjacent pixel 401*b* changes according to the level of the pixel 401*a*, which is the central pixel of the cluster defect. It is possible to detect adjacent defects using this.

For example, the method that was explained in the First Embodiment is used, in which in a case in which the pulse signal number for the control signal CLK for the period for one frame is reduced and image capturing is performed using the image capturing apparatus 1, gain is applied. By doing so, it is possible to keep the output for the pixel 401*a*, which is the central pixel in the cluster defect, stable.

The pixel level for the adjacent pixel 401*b* at this time is compared, and it can be understood that the pixel for which the pixel level changes according to the decrease in the pulse signal number for the control signal CLK for the period for one frame is the adjacent pixel for the cluster-type defect, and therefore, it can be made a correction target.

That is, in a case in which the detecting unit 201 of the defective pixel detecting unit 108 determines whether or not a pixel is a correction target, when the mode has been switched from the first mode to the second mode, determinations can be made based on changes in the pixel levels for the pixels that are arranged around the pixel that is made the correction target. Note that, this is not limited to switching modes, and this may also follow decreases in the pixel signal number as was described above, or it may also be at the timing at which the pulse signal number has been decreased.

In addition, the possibility that adjacent defects will occur around a pixel for which the defect amount is incredibly large is high, and therefore, the surroundings of a pixel for which the defect amount is particularly large in comparison to the surrounding pixels may also be stored in the defective pixel data as adjacent defects.

If cluster-type defective pixels can be detected, it is also possible to prevent insufficient correction of cluster type defects. The defect amount changes with the pulse signal number for the control signal CLK for adjacent pixels (pixels that have been arranged around the pixel 401*a*) that are adjacent to the pixel 401*a*, which is the central pixel of the cluster-type defect.

Therefore, if the defective pixel that is the adjacent pixel 401*b* is specified, the defect detection processing that is performed when the pulse signal number for the control signal CLK for the period for one frame has been changed improves if detection can be performed with just the adjacent pixel 401*b* as the target, and it is possible to decrease the processing amount for the detection. In addition, it is also possible to decease the information amount for the defective pixel data at the same time.

Figure 23:
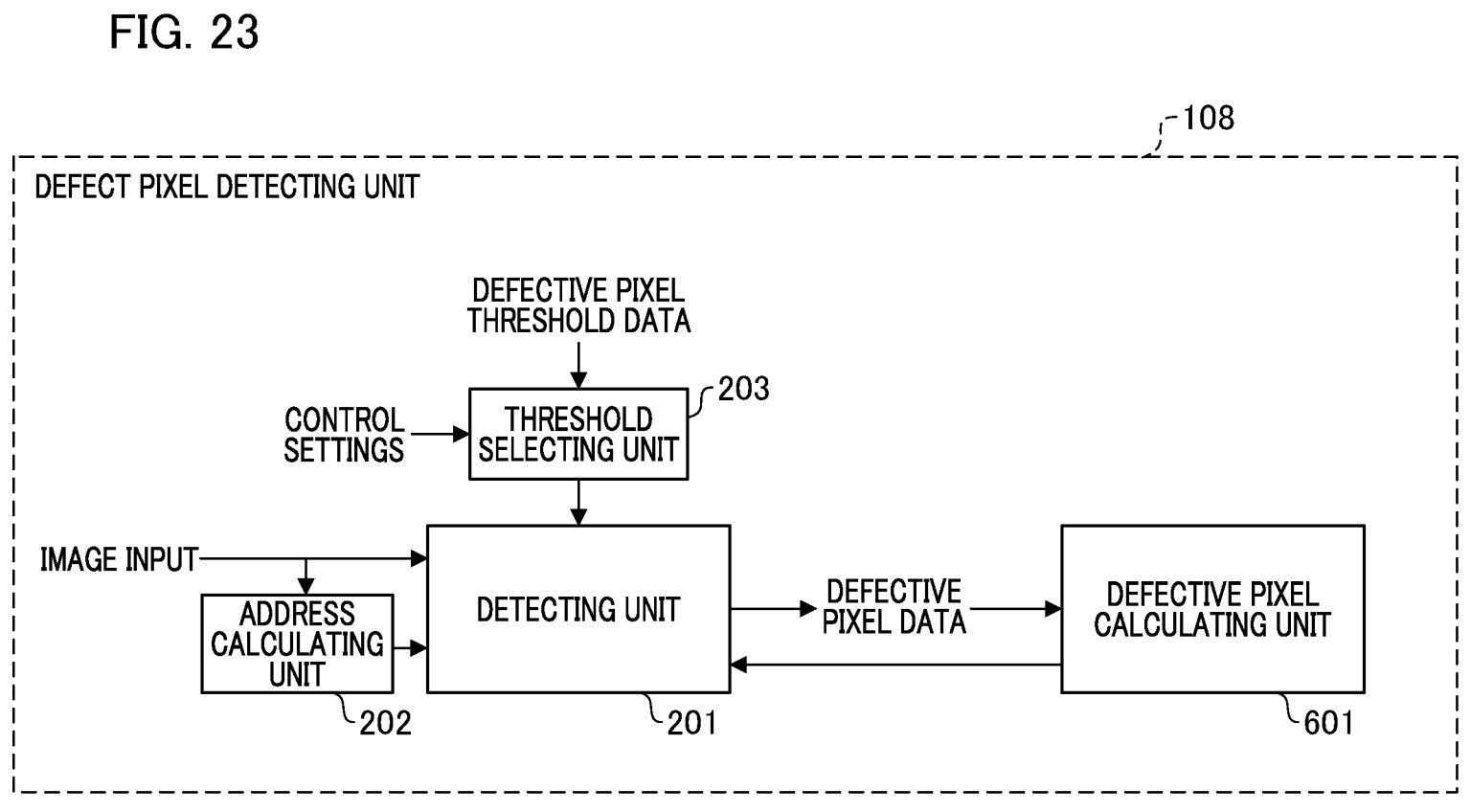

FIG. 23 is a diagram showing an internal configuration of the defective pixel detecting unit 108 in the Third Embodiment. The defective pixel detecting unit 108 that is shown in FIG. 23 has a configuration in which the defective pixel calculating unit 601 has been added to the configuration of the defective pixel detecting unit 108 that was explained in FIG. 2. Therefore, explanations of the configurations other than that for the defective pixel calculating unit 601 will be omitted.

As was shown in FIG. 17, and FIG. 18, the smaller that the pulse signal number for the control signal CLK is, the smaller that the level for the adjacent pixel 401*b* of the cluster-type defect will become. In addition, the relationship between the pulse signal number for the control signal CLK and the pixel level for the adjacent pixel 401*b* in relation to the pixel 401, which is the central pixel in the cluster defect, becomes the same as in FIG. 18.

The defective pixel calculating unit (estimating unit) 601 uses the defective pixel data that was acquired during driving for the plurality of pulse signal numbers for the control signal CLK and estimates (predicts) the defective pixel data for the control settings in another mode.

That is, the defective pixel data that was acquired during the plurality of modes for which the clock numbers are different that were shown in the First Embodiment and the Second Embodiment is used, and the defective pixel data for the control settings in another mode for which the clock number is different than for this plurality of modes is estimated.

Specifically, the defective image data for other control settings is predicted based on the relationship between the pulse signal number for the control signal CLK, and the pixel level for the adjacent pixel 401*b* in relation to the pixel 401*a*, which is the central pixel in the cluster defect, which were shown in FIG. 18.

For example, the pixel level for the adjacent pixel 401*b* is acquired from the pixel value from the time of the pulse signal number N1 for the control signal CLK and the defective pixel data from the pulse signal number Nn for the control signal CLK.

As is shown in FIG. 18, the pixel level for the adjacent pixel 401*b* in relation to the pixel 401*a*, which is the central pixel in the cluster defect, becomes gradually smaller as the pulse signal number decreases, and this becomes a relationship such that when the pulse signal number is small, the rate for the decrease becomes particularly large. Specifically, this is shown in the Formula (1) below.

$$f(x) = \frac{\mathrm{LN}\left(\frac{1-x}{N}\right)}{\mathrm{LN}\left(\frac{1-x_{cross}}{N}\right)} \ldots \quad (1)$$

In this context, N is the pulse signal number, x is the pixel level for the central pixel, and $x_{cross}$ is the pixel level for the adjacent pixel. Based on this relationship, by inserting the pixel value from the time of the pulse signal number N1 of the control signal CLK, and the pixel value for the pulse signal number Nn for the control signal CLK, the size of the adjacent defect during an arbitrary pulse signal number for the control signal CLK is calculated.

The defective pixel data including the size of the adjacent defect for the adjacent pixel 401*b* that was calculated by the defective pixel calculating unit 601 is input to the detecting unit 201. After this, the detecting unit 201 performs a comparison of this with the threshold data for the drive for the pulse signal number for the control signal CLK, and generates the defective pixel data.

The detecting unit 201 stores the defective pixel data on the RAM 105 and the ROM 106 in a predetermined format in the same manner as in the First Embodiment. In addition, the defective pixel correcting unit 109 performs correction of the defective pixel using the same method as in the First Embodiment.

Above, in the image capturing apparatus 1 of the Third Embodiment, by using the defective pixel data for a plurality of drive modes, it is possible to predict the defective pixel data for other control settings, and to make it such that the processing amount for the defect detection can be reduced, and the information amount for the defective pixel data can also be decreased.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image capturing apparatus through a network or various storage media. Then, a computer (or a CPU, an MPU, or the like) of the image capturing apparatus may be configured to read and execute the program. In such a case, the program and the storage medium storing the program configure the present invention.

In addition, the present invention also includes articles that are realized using, for example, at least one processor or circuit configured to function as the embodiments explained above. Note that a plurality of processors may also be used, and made to perform distributed processing.

This application claims the benefit of Japanese Patent Application No. 2023-027237, filed on Feb. 24, 2023, which is hereby incorporated by reference herein in its entirety.

What is claimed is:

1. An image capturing apparatus comprising: a photoelectric conversion element that comprises an avalanche photodiode; at least one processor; and a memory coupled to the at least one processor, the memory storing instructions that, when executed by the at least one processor, cause the at least one processor to:

acquire a signal from the photoelectric conversion element;

perform correction processing on the signal based on position information for a pixel that is determined as a correction target; and control a number of pulses for a pulse signal during a period in which the signal is acquired for one frame; wherein a threshold for determining whether or not the correction processing will be performed on the signal is different in a first mode and in a second mode, wherein the number of pulses for the pulse signal is less in the second mode than in the first mode.

2. The image capturing apparatus according to claim 1, wherein the threshold according to the number of pulses for the pulse signal is selected from among a plurality of thresholds that have been set in advance.

3. The image capturing apparatus according to claim 2, wherein whether or not the signal is the correction target based on the threshold that has been selected.

4. The image capturing apparatus according to claim 3, wherein in a case where there is a pixel that exceeds the threshold that has been selected, the pixel that exceeds the threshold is determined as the correction target.

5. The image capturing apparatus according to claim 1, wherein the memory stores further instructions that, when executed by the at least one processor, cause the at least one processor to:

switch between the first mode and the second mode; wherein the first mode and the second mode are switched according to an illuminance based on at least a signal acquired from the photoelectric conversion element.

6. The image capturing apparatus according to claim 1, wherein the memory stores further instructions that, when executed by the at least one processor, cause the at least one processor to:

hold the position information.

7. The image capturing apparatus according to the claim 1, wherein a threshold for the second mode is selected from among a plurality of thresholds so that the selected threshold is a smaller value than a threshold for the first mode.

8. The image capturing apparatus according to claim 1, wherein the memory stores further instructions that, when executed by the at least one processor, cause the at least one processor to apply a gain to the signal.

9. The image capturing apparatus according to claim 8, wherein the threshold is increased when a gain has been applied to the signal in the same mode.

10. The image capturing apparatus according to claim 1, wherein a pixel for which the pixel level changes according to the mode in the signal that has been acquired in the first mode and the signal that has been acquired in the second mode is set as the correction target.

11. The image capturing apparatus according to claim 1 wherein the correction processing is performed on the signal based on pixel levels of pixels that have been arranged around a pixel of the correction target.

12. The image capturing apparatus according to claim 1, further comprising a third mode for which the number of pulses for the pulse signal during a period in which a signal for one frame is acquired is different than in the first mode and the second mode; and wherein whether or not the signal that is acquired in the third mode is determined as a correction target, based on data for a pixel that is a correction target that was acquired in the first mode and the second mode.

13. The image capturing apparatus according to claim 12, wherein the memory stores further instructions that, when executed by the at least one processor, cause the at least one processor to:

switch between the first mode, the second mode, and the third mode according to the number of pulses for the control signal.

14. The image capturing apparatus according to claim 1, wherein the memory stores further instructions that, when executed by the at least one processor, cause the at least one processor to:

estimate each pixel information for a pixel that will become a correction target in a mode for a clock number that is different from the number of pulses for the pulse signal in the first mode and the second mode based on each pixel information for a pixel that will become a correction target that was acquired in the first mode and the second mode.

15. The image capturing apparatus according to claim 3, wherein in a case in which whether or not a pixel is the correction target is determined, when the first mode has been switched to the second mode, this determination is performed based on changes in a pixel level of a pixel that is arranged around the pixel that will be made the pixel target.

16. The image capturing apparatus according to claim 1, wherein the number of pulses for the pulse signal is changed according to an illuminance in a signal that has been acquired from the photoelectric conversion element.

17. A control method for an image capturing apparatus, the control method comprising:

acquiring a signal from a photoelectric conversion element comprising an avalanche photodiode;

performing correction processing on the signal based on position information for a pixel that is determined as a correction target; and controlling a number of pulses for a pulse signal during a period in which the signal for one frame is acquired; wherein when the correction processing is performed, a threshold for determining whether or not the correction processing will be performed on the signal is different in a first mode and a second mode wherein the number of pulses for the pulse signal is less in the second mode than in the first mode.

18. A non-transitory computer-readable storage medium configured to store a computer program for an image capturing apparatus to execute the following steps:

acquiring a signal from a photoelectric conversion element comprising an avalanche photodiode;

performing correction processing on the signal based on position information for a pixel that is determined as a correction target; and controlling a number of pulses for a pulse signal during a period in which the signal for one frame is acquired; wherein when the correction processing is performed, a threshold for determining whether or not the correction processing will be performed on the signal is different in a first mode and a second mode, wherein the number of pulses for the pulse signal is less in the second mode than in the first mode.

* * * * *